United States Patent
Lee

(10) Patent No.: US 9,439,250 B2
(45) Date of Patent: Sep. 6, 2016

(54) DRIVING LIGHT EMITTING DIODE (LED) LAMPS USING POWER RECEIVED FROM BALLAST STABILIZERS

(71) Applicant: SAMSUNG ELECTRONICS CO., LTD., Suwon-Si, Gyeonggi-do (KR)

(72) Inventor: Bong Jin Lee, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/053,377

(22) Filed: Oct. 14, 2013

(65) Prior Publication Data

US 2014/0084800 A1  Mar. 27, 2014

Related U.S. Application Data

(63) Continuation-in-part of application No. 14/034,324, filed on Sep. 23, 2013, now Pat. No. 9,055,636.

(30) Foreign Application Priority Data

Sep. 24, 2012 (KR) .................. 10-2012-0106041
Mar. 27, 2013 (KR) .................. 10-2013-0032811

(51) Int. Cl.
*H05B 33/08* (2006.01)
*H05B 37/02* (2006.01)

(52) U.S. Cl.
CPC ...... *H05B 33/0809* (2013.01); *H05B 33/0815* (2013.01); *H05B 33/0872* (2013.01); *H05B 33/0896* (2013.01); *H05B 37/0227* (2013.01)

(58) Field of Classification Search
None
See application file for complete search history.

(56) References Cited

U.S. PATENT DOCUMENTS

| 7,759,880 | B2 | 7/2010 | Maros et al. |
| 8,120,278 | B2 | 2/2012 | Choi et al. |
| 8,125,158 | B2 | 2/2012 | Nishino et al. |
| 2003/0102810 | A1 | 6/2003 | Cross et al. |
| 2004/0012959 | A1 | 1/2004 | Robertson et al. |
| 2009/0032800 | A1* | 2/2009 | Lee .................. H01L 33/08 257/13 |
| 2009/0072945 | A1 | 3/2009 | Pan et al. |
| 2010/0194296 | A1 | 8/2010 | Park |

(Continued)

FOREIGN PATENT DOCUMENTS

| CN | 102217102 A | 10/2011 |
| CN | 102348319 A | 2/2012 |

(Continued)

OTHER PUBLICATIONS

United Kingdom Search Report issued in Application No. GB 1316873.7 dated Feb. 11, 2014.

(Continued)

*Primary Examiner* — Jany Richardson

(57) ABSTRACT

A circuit drives a light emitting diode (LED) lamp based on alternating current (AC) power received from a ballast stabilizer. The circuit includes an inductive load, a rectifying circuit, and an output circuit. The inductive load is coupled to and receives the AC power from the ballast stabilizer. The rectifying circuit is electrically coupled to the inductive load and rectifies the AC power to produce a unidirectional current. The output circuit receives the unidirectional current from the rectifying circuit, and produces an output current for driving the LED lamp. Various additional circuits and illuminating apparatuses for producing light from AC power using a LED lamp are also provided.

32 Claims, 28 Drawing Sheets

(56) References Cited

U.S. PATENT DOCUMENTS

| | | | |
|---|---|---|---|
| 2010/0270941 A1 | 10/2010 | Hui | |
| 2011/0121756 A1* | 5/2011 | Thomas | H05B 33/0809 315/294 |
| 2012/0018764 A1 | 1/2012 | Choi et al. | |
| 2012/0161666 A1* | 6/2012 | Antony | H05B 33/0809 315/294 |
| 2012/0181952 A1 | 7/2012 | Roeer | |
| 2014/0070714 A1* | 3/2014 | Lee et al. | 315/186 |
| 2014/0204571 A1* | 7/2014 | Zhang et al. | 362/222 |

FOREIGN PATENT DOCUMENTS

| | | |
|---|---|---|
| CN | 102573166 A | 7/2012 |
| DE | 102010003266 A1 | 9/2011 |
| EP | 2469984 A2 | 6/2012 |
| KR | 10-0980032 B1 | 9/2010 |
| KR | 10-0996670 B1 | 11/2010 |
| KR | 10-2011-0032435 A | 3/2011 |
| KR | 10-2011-0062243 A | 6/2011 |
| KR | 10-2011-0067212 A | 6/2011 |
| KR | 10-2011-0084606 A | 7/2011 |
| KR | 10-1073289 B1 | 10/2011 |
| KR | 10-1091046 | 12/2011 |
| KR | 10-1102781 B1 | 1/2012 |
| KR | 10-1144629 B1 | 5/2012 |
| TW | 200913779 A | 3/2009 |
| WO | 2009-010802 A2 | 1/2009 |
| WO | 2011/155712 A9 | 12/2011 |
| WO | 2011/159048 A9 | 12/2011 |
| WO | 2012/050348 | 4/2012 |

OTHER PUBLICATIONS

Chinese Office Action issued in Chinese Application No. 201310449412.9 dated Sep. 14, 2015, with English Translation.
Chinese Office Action issued in Chinese Application No. 2013104494129, dated Mar. 18, 2015, with English translation.
Tawainese Office Action issued in Application No. 102134309 dated Jun. 17, 2015.
German Decision of Grant issued in German Application No. 102013110327.8 dated Aug. 19, 2014, w/English translation.
U.S. Office Action issued in U.S. Appl. No. 14/034,324 dated Sep. 23, 2014.

* cited by examiner

DRIVING LIGHT EMITTING DIODE (LED) LAMPS USING POWER RECEIVED FROM BALLAST STABILIZERS

CROSS-REFERENCE TO RELATED APPLICATIONS

This application is a continuation in part of U.S. patent application Ser. No. 14/034,324, filed on Sep. 23, 2013 which claims priority to, and the benefit of, Korean Patent Applications No. 2012-0106041 filed on Sep. 24, 2012, and No. 2013-0032811 filed on Mar. 27, 2013, in the Korean Intellectual Property Office, the disclosures of which are incorporated herein by reference.

TECHNICAL FIELD

The present inventive concepts relate to driving of light emitting diode (LED) lamps using power received from ballast stabilizers.

BACKGROUND

A light emitting diode (LED) is driven by direct current (DC) power. Hence, in order to substitutively employ an LED illuminating apparatus as a light source in a lamp driven by alternating current (AC) power, a driving device is required. In addition, a ballast stabilizer for a fluorescent lamp outputs an appropriate amount of power for driving a fluorescent lamp. Hence, if an LED illuminating apparatus exhibiting electrical characteristics different from those of a fluorescent lamp is used, the LED illuminating apparatus may not operate normally or a device component may be damaged. As a solution thereto, a ballast stabilizer installed in a fluorescent lamp is removed and a power supplier for an LED illuminating apparatus is installed instead. Thus, a light source driving device, allowing for compatibility between a ballast stabilizer for a fluorescent lamp and an LED illuminating apparatus is required.

SUMMARY

An aspect of the present inventive concepts provides a light source driving device compatible with a ballast stabilizer for a fluorescent lamp.

An aspect of the present inventive concepts provides an illuminating apparatus using the foregoing light source driving device.

According to an aspect of the present inventive concept, there is provided a circuit for driving a light emitting diode (LED) lamp including a plurality of LEDs based on alternating current (AC) power received from a ballast stabilizer configured to power a lamp. The circuit includes: an inductive load coupled to the ballast stabilizer and configured to receive the AC power at terminals thereof; a rectifying circuit, electrically coupled to the inductive load and configured to rectify the AC power to produce a unidirectional current; and an output circuit configured to receive the unidirectional current from the rectifying circuit, and to produce an output current for driving the LED lamp.

The inductive load may be directly connected to the ballast stabilizer.

The inductive load may be a transformer configured to receive the AC power at terminals of an input winding, and to produce a transformed AC power at terminals of an output winding. The transformer may be an isolation transformer.

The rectifying circuit may include a rectifying diode coupled to a terminal of the output winding of the inductive load.

The output circuit can include a low-pass filter including an inductor and configured to produce the output current for driving the LED lamp from an output terminal of the low-pass filter; and a free-wheeling diode coupled between input terminals of the low-pass filter.

The rectifying circuit can include a full-wave rectifier. The rectifying circuit can alternatively or additionally include a half-wave rectifier.

A thermistor may be connected in series with the inductive load to receive the AC power.

A parallel interconnection of a resistor and a switch may be coupled in series with the inductive load to receive the AC power.

According to another aspect of the present inventive concept, there is provided an illuminating apparatus for producing light using a light emitting diode (LED) lamp including a plurality of LEDs based on alternating current (AC) power received from a ballast stabilizer configured to power a lamp. The illuminating apparatus includes: a transformer coupled to the ballast stabilizer, configured to receive the AC power and to output transformed AC power having an amplitude appropriate for driving the LED lamp; a rectifying circuit configured to receive the transformed AC power from the transformer, and to rectify the AC power into direct current (DC) power for driving the LED lamp; and an output circuit configured to receive and filter the rectified DC power from the rectifying circuit, and to drive the LED lamp using the filtered DC power.

The transformer may be directly connected to the ballast stabilizer.

The output circuit may include an inductor. The output circuit may further include: a filter circuit including the inductor and driving the LED lamp; and a free-wheeling diode coupled between input terminals of the filter circuit and configured to cause the filter circuit to provide DC power to the LED lamp when the rectifying circuit is turned off.

The transformer may include at least two input windings each coupled between two of at least three input terminals receiving the AC power, such that a voltage difference exists between two input terminals of each input winding.

The rectifying circuit may include a full-bridge diode rectifier. Alternatively or additionally, the rectifying circuit may include a half-wave diode rectifier.

The output circuit can include at least one of a DC-DC converter and a linear regulator driving the LED lamp using the filtered DC power.

The transformer can include two output windings, and the rectifying circuit can be a full-wave rectifier including two rectifying diodes each coupled to one of the two output windings.

According to a further aspect of the present inventive concept, there is provided a circuit for driving a light emitting diode (LED) lamp based on alternating current (AC) power received from a ballast stabilizer configured to power a lamp. The circuit includes: a rectifying circuit coupled to the ballast stabilizer and configured to receive the AC power at a pair of input terminals, and to produce rectified direct current (DC) power at a pair of output terminals; and a filter circuit comprising a series interconnection of an inductor and a capacitor, wherein the series interconnection is coupled between the pair of output terminals of the rectifying circuit, and wherein a voltage across the capacitor drives the LED lamp.

The circuit can further include at least one of a DC-DC converter and a linear regulator driving the LED lamp using the voltage across the capacitor.

The ballast stabilizer may be configured to power a fluorescent lamp. The ballast stabilizer may alternatively or additionally be configured to power a halogen lamp.

According to another aspect of the present inventive concept, there is provided an illuminating apparatus including: a plate including a light emitting diode (LED) lamp comprising a plurality of LEDs, and a circuit for driving the LED lamp based on alternating current (AC) power received from a ballast stabilizer configured to power a lamp; a housing having the plate mounted therein, and configured to protect the plate, LED lamp, and driving circuit; and a socket disposed in an end portion of the plate and configured to receive the AC power from the ballast stabilizer at a pair of terminals. The circuit for driving the LED lamp disposed on the plate includes: an inductive load coupled to the pair of terminals of the socket and configured to receive the AC power from the ballast stabilizer; a rectifying circuit, electrically coupled to the inductive load and configured to rectify the AC power to produce a unidirectional current; and an output circuit configured to receive the unidirectional current from the rectifying circuit, and to produce an output current for driving the LED lamp.

The inductive load can be a transformer directly connected to the pair of terminals of the socket to receive the AC power from the ballast stabilizer, and configured to receive the AC power at terminals of an input winding of the transformer and to produce a transformed AC power at terminals of an output winding of the transformer.

The rectifying circuit can include a rectifying diode coupled to a terminal of the output winding of the inductive load.

The output circuit can include a low-pass filter including a series interconnection of an inductor and a capacitor, wherein the LED lamp is coupled in parallel with the capacitor; and can further include a free-wheeling diode coupled between input terminals of the low-pass filter.

The foregoing technical solutions do not fully enumerate all of the features of the present inventive concept. The foregoing and other objects, features, aspects and advantages of the present inventive concept will become more apparent from the following detailed description of the present inventive concept when taken in conjunction with the accompanying drawings.

BRIEF DESCRIPTION OF THE DRAWINGS

The above and other aspects, features and other advantages of the present inventive concept will be more clearly understood from the following detailed description taken in conjunction with the accompanying drawings, in which.

DETAILED DESCRIPTION OF THE PREFERRED EMBODIMENT

Figure 1:
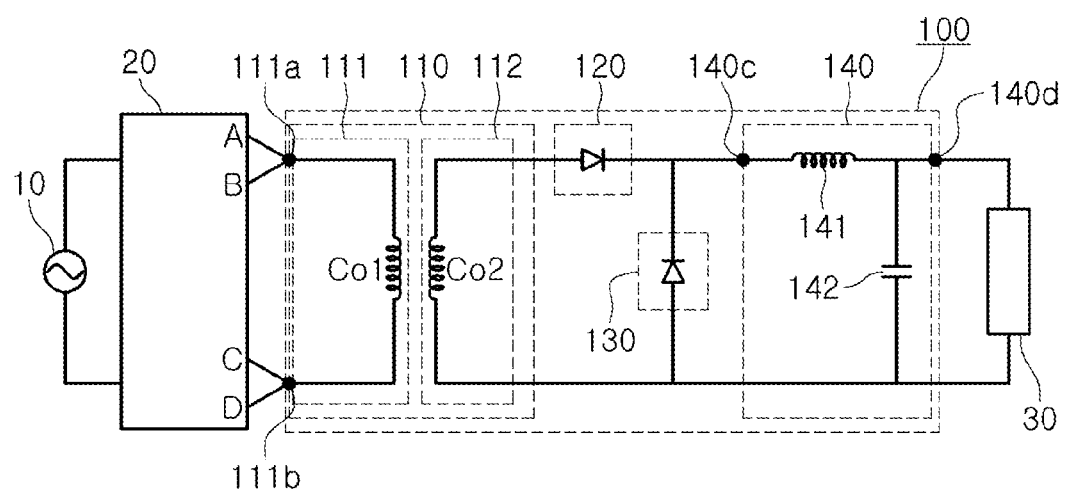
FIG. 1 is a circuit diagram of a light source driving device according to an embodiment of the present inventive concepts.

Embodiments of the present inventive concepts will now be described in detail with reference to the accompanying drawings.

The inventive concepts may, however, be embodied in many different forms and should not be construed as being limited to the embodiments set forth herein. Rather, these embodiments are provided so that this disclosure will be thorough and complete and will fully convey the scope of the inventive concepts to those skilled in the art. In the drawings, the shapes and dimensions of elements may be exaggerated for clarity, and the same reference numerals will be used throughout to designate the same or like components.

FIG. 1 is a circuit diagram of a light source driving device according to an embodiment of the present inventive concepts.

Referring to FIG. 1, a light source driving device 100 according to an embodiment of the present inventive concepts includes a transformer unit 110 including a primary winding part 111 and a secondary winding part 112, a rectifying diode configured to rectify output power from the secondary winding part 112 of the transformer unit 110, a filter unit 140 having an input terminal 140c and an output terminal 140d, and an open loop preventing unit 130 providing a closed loop to the filter unit 140 when the rectifying diode 120 is turned off.

The transformer unit 110 functions as an inductive load to the ballast stabilizer 20 and receives alternating current (AC) power from the ballast stabilizer 20. As shown, the transformer unit 110 is directly connected to output terminals of the ballast stabilizer 20. The transformer unit 110 may be an isolation transformer. The primary winding part 111 of the transformer unit 110 may include first and second external input terminals 111a and 111b that receive external AC power through a ballast stabilizer 20 from an external power source 10. The ballast stabilizer 20 has first to fourth output terminals A, B, C, and D, and the external input terminals 111a and 111b may receive the external power respectively from a short-circuit interconnection of the first and second output terminals A and B and from a short-circuit interconnection of the third and fourth output terminals C and D of the ballast stabilizer 20.

In order to stably drive a fluorescent lamp, the ballast stabilizer 20 receives the external power, converts the received external power in consideration of electrical characteristics of a general fluorescent lamp, and outputs the converted power at the terminals A, B, C, and D for driving a lamp, such as a fluorescent or halogen lamp. The ballast stabilizer 20 may be installed in general lighting equipment for a fluorescent lamp or a halogen lamp. Hereinafter, the ballast stabilizer 20 will be described in detail. However, it is described to help clearly understand the present inventive concepts and the ballast stabilizer 20 mentioned in the present embodiment is not limited to the description below.

In general, a fluorescent lamp may have high impedance or low impedance according to whether or not the fluorescent lamp is discharged. In detail, the fluorescent lamp takes on insulation characteristics in a state before being lighted, and in this case, the fluorescent lamp has high impedance, e.g., very high impedance ranging from tens of kΩ to hundreds of kΩ. When a high voltage is applied to the fluorescent lamp so as to cause the lamp to discharge and to reach a lit state, the fluorescent lamp forms a channel through which a current flows and exhibits low impedance. For example, low impedance may range from about 700Ω to about 800Ω.

In consideration of the electrical characteristics of the fluorescent lamp, the ballast stabilizer 20 may selectively output ignition power and/or normal power. In detail, the ballast stabilizer 20 may be an electronic ballast stabilizer and may include a power factor correction circuit and an inverter. The inverter can be implemented as an LLC resonance inverter, a full-bridge inverter, or a half-bridge inverter. When input impedance of the fluorescent lamp corresponds to a high impedance value of the fluorescent lamp, the ballast stabilizer 20 may recognize that fluorescent lamp is in a state before being lighted and may output ignition power having a high voltage for initial discharge. A voltage value of the ignition power may range from about 500V to 1 kV. In contrast, when input impedance of the fluorescent lamp to the ballast stabilizer corresponds to a low impedance value of the fluorescent lamp, the ballast stabilizer 20 may recognize that the fluorescent lamp is in a lit state and may output a normal amount of power. Here, a voltage value of the normal power may range from 100V to 300V, for example.

When a light source driving device employing an LED as a light source is connected to the ballast stabilizer 20, the impedance of the light source driving device is recognized by the ballast stabilizer 20 as being different from the impedance of a fluorescent lamp so the ballast stabilizer 20 may malfunction. For example, the ballast stabilizer 20 may not output power or may output ignition power continuously. In this case, the light source driving device may not be normally driven and/or may be damaged.

Thus, according to an embodiment of the present inventive concepts, a coil Co1 of the primary winding part 111 may have an impedance that is matched to the impedance of a fluorescent lamp in a lit state. Namely, the coil Co1 may form an inductive load coupled to the ballast stabilizer 20, and may be selected to have an impedance set to cause the ballast stabilizer 20 to determine that a fluorescent light in a lit state is connected to the ballast stabilizer 20, and to cause the ballast stabilizer 20 to output a normal amount of power.

A voltage and a current output when the ballast stabilizer 20 is in a state of outputting normal power are defined as $V_{lamp}$ and $I_{lamp}$, respectively. An impedance $Z_x$ set to allow the ballast stabilizer 20 to output a normal amount of power may be obtained from Equation 1.

$$Z_x = \frac{V_{lamp}}{I_{lamp}} \qquad \text{[Equation 1]}$$

The impedance $Z_x$ may have a value ranging from about 700Ω to about 800Ω, for example, but the present inventive concepts are not limited thereto.

The coil Co1 of the primary winding part 111 may be set to have an inductance $L_x$ calculated by Equation 2.

$$L_x = \frac{Z_x}{2\pi \cdot f_a}, \qquad \text{[Equation 2]}$$

where $Z_x$ is the impedance set to allow the ballast stabilizer 20 to output a normal amount of power, and $f_a$ is a frequency of the external power output from the ballast stabilizer 20 after being modulated.

The transformer unit 110 may include the secondary winding part 112 electromagnetically coupled to the primary winding part 111. The secondary winding part 112 may transform the external power received from the ballast stabilizer 20 through the external input terminals 111a and 111b of the primary winding part 111. Namely, the external power received from the ballast stabilizer 20 may have a voltage having a magnitude inappropriate for driving a light source using an LED. Therefore, the secondary winding part 112 may transform the external power received from the ballast stabilizer 20 into power having a magnitude appropriate for an LED lamp serving as a light source (hereinafter, referred to as an 'external light source 30') employable in the light source driving device 100 according to an embodiment of the present inventive concepts. Also, the secondary winding part 112 prevents the external power source 10 from being directly connected to the external light source 30, and thereby protects the light source driving device 100.

The rectifying diode 120 or other rectifying circuit is coupled to outputs of the transformer unit 110, half-wave rectifies power received from the secondary winding part 112 of the transformer unit 110 to produce a unidirectional current, and transfers the half-wave rectified power and unidirectional current to an input terminal 140c of an output circuit.

The output circuit can include the filter unit 140 as well as the open loop preventing unit 130. The filter unit 140 receives the rectified power from the rectifying diode 120 at input terminal 140c thereof, and provides a light source driving voltage for driving the external light source 30 to an output terminal 140d thereof. The filter unit 140 may serve to reduce noise and a ripple voltage of the light source driving power. In general, the filter unit 140 is a low-pass filter circuit.

For example, the filter unit 140 may include a series interconnection of an inductor 141 and a capacitor 142 operative to transfer light source driving power to the output terminal 140d. The filter unit 140 may buffer current and voltage fluctuations of the light source driving power prior to the transfer to the output terminal 140d. Namely, the filter unit 140 transfers power, which has been applied to the input terminal 140c when the rectifying diode 120 is turned on, to the output terminal 140d. The filter unit 140 further stores a partial amount of power applied to the input terminal 140c, and when the rectifying diode 120 is turned off, the filter unit 140 may apply the power stored therein to the output terminal 140d. A detailed operation of the filter unit 140 will be described together with the open loop preventing unit 130. Meanwhile, referring to the embodiment of FIG. 1, the filter unit 140 is implemented as a low pass filter (LPF), but the present inventive concept is not limited thereto.

The open loop preventing unit 130 provides a closed loop in the filter unit 140 when the rectifying diode 120 is turned off. The open loop preventing unit 130 may include a free-wheeling diode coupled between terminals of the filter unit 140. An operation of the open loop preventing unit 130 will be described with reference to FIGS. 2A through 2C.

Figure 2A:
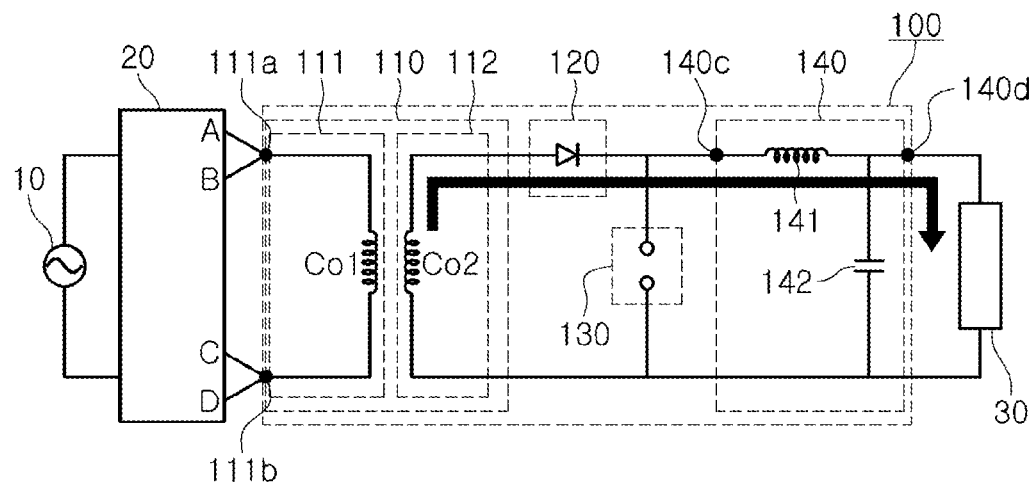
FIGS. 2A through 2C are circuit diagrams illustrating operational states of the light source driving device according to an embodiment of the present inventive concepts.
Figure 2B:
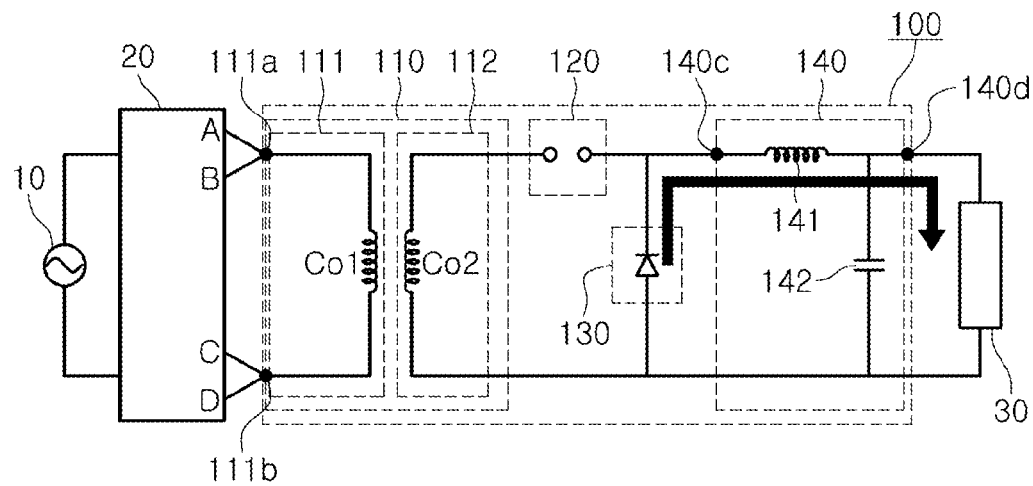
Figure 2C:
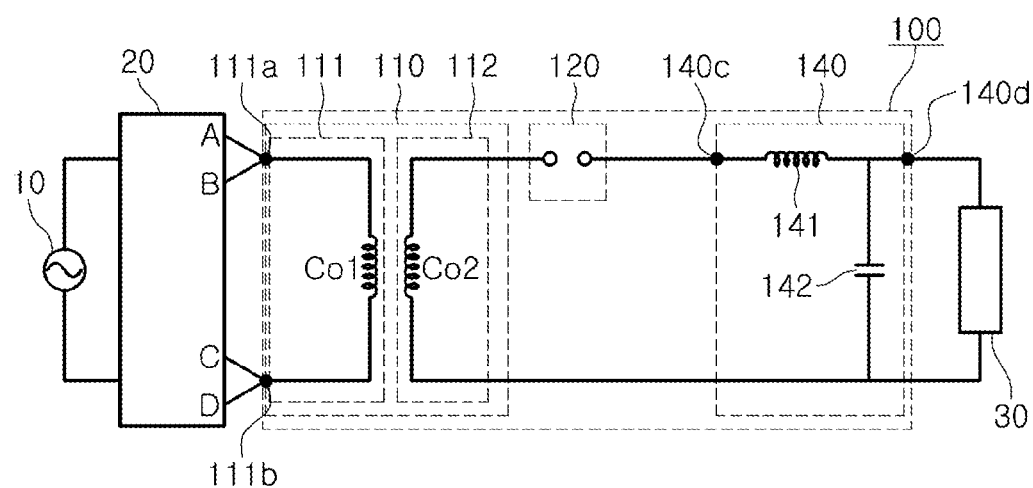

FIGS. 2A through 2C are circuit diagrams illustrating operational states of the light source driving device 100 according to an embodiment of the present inventive concepts. Specifically, FIGS. 2A through 2C are circuit diagrams illustrating operational states according to the conductive state (turned-on or turned-off) of the rectifying diode 120.

Referring to FIG. 2A, when a direction of a voltage of output power from the secondary winding part 112 is a clockwise direction, the rectifying diode 120 is turned on and the filter unit 140 forms a closed loop with the secondary winding part 112 to supply light source driving power to the external light source 30.

Meanwhile, when a direction of the voltage of the output power from the secondary winding part 112 is a counter-clockwise direction, the rectifying diode 120 is turned off. In this case, as illustrated in FIG. 2C, the filter unit 140 is electrically separated from the secondary winding part 112 and cannot receive output power from the secondary winding part 112 for applying light source driving power to the external light source 30. Also, since an open loop is formed, it is difficult to supply the light source driving power stored in the filter unit 140 when the rectifying diode 120 is turned on to the external light source 30.

Thus, in an embodiment of the present inventive concepts, the open loop preventing unit 130 is provided. Referring to FIG. 2B, when the rectifying diode 120 is turned off, the open loop preventing unit 130 provides a closed loop in the filter unit 140. Thus, when the rectifying diode 120 is turned off, the filter unit 140 may supply power stored therein to the external light source 30.

According to the present disclosure, light source driving devices directly compatible with ballast stabilizers are provided.

Figure 3:
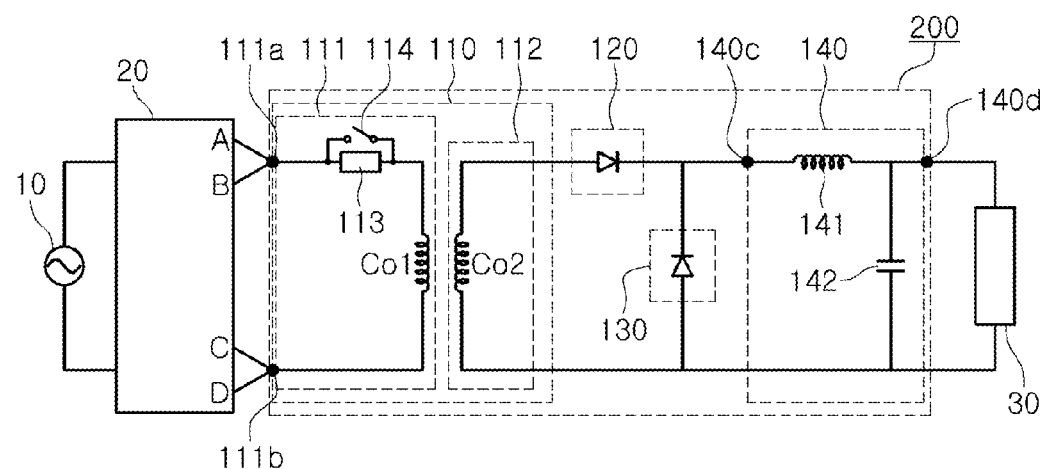
FIGS. 3 through 7 are circuit diagrams illustrating light source driving devices according to different embodiments of the present inventive concepts.
Figure 4:
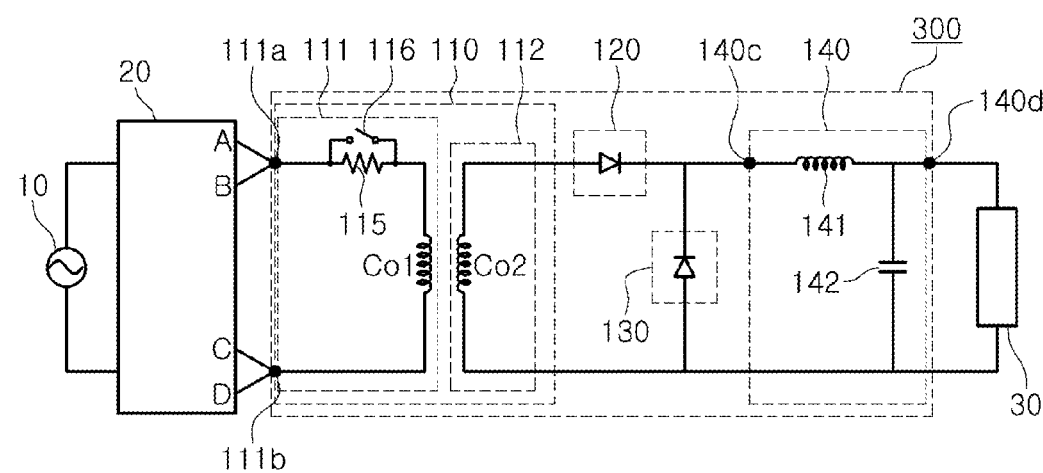

FIGS. 3 and 4 are circuit diagrams illustrating light source driving devices according to different embodiments of the present inventive concepts.

The ballast stabilizer 20 may be required to be compatible with lighting devices having high input impedance such as the input impedance of a fluorescent light before the fluorescent light is lighted. In operation, the ballast stabilizer 20 may monitor a voltage of an output terminal of the ballast stabilizer 20. When ignition power is not detected at the time of initial driving, the ballast stabilizer 20 may determine that the fluorescent lamp has an error and may not output power or may continuously output ignition power. In order to be compatible with the ballast stabilizer 20, the light source driving device may have an impedance set such that the ballast stabilizer 20 outputs ignition power at the time of initial driving. Namely, the light source driving device may have an input impedance as high as the impedance of a fluorescent light before the fluorescent lamp is lighted.

Referring to FIG. 3, the light source driving device 200 further includes a thermistor 113 connected to at least one of the first and second external input terminals 111a and 111b of the primary winding part 111. The thermistor 113 is connected in series with the coil Co1 of the transformer unit 110.

As the thermistor 113, an NTC (Negative Temperature Coefficient) thermistor may be used. The NTC thermistor has high impedance at a low temperature condition and the impedance is reduced according to an increase in temperature. Thus, at the time of initial driving, the sum of impedance of the coil Co1 of the primary winding part 111 and impedance of the NTC thermistor may be adjusted to match the high input impedance of a fluorescent lamp before the fluorescent lamp is lighted, to thus allow the ballast stabilizer 20 to output ignition power.

Here, a majority of a high voltage of the ignition power is applied to the thermistor 113 according to a voltage distribution principle. Hence, although ignition power is applied to the light source driving device 200, the light source driving device 200 and the external light source 30 can be protected from the high voltage.

In the case of using an NTC thermistor, as driving starts, the temperature of thermistor 113 increases and the thermistor's impedance decreases. Thus, the sum of the impedance of the primary winding part coil Co1 and the impedance of the thermistor 113 may decrease sufficiently so as to reach a value set for the ballast stabilizer 20 to output a normal amount of power. When the impedance value for normal operation is reached, the ballast stabilizer 20 outputs normal power.

Meanwhile, the light source driving device according to the present embodiment may further include a switching unit 114 connected in parallel with the thermistor 113. Although impedance of the thermistor 113 is gradually reduced to reach a state in which the ballast stabilizer 20 outputs normal power, the thermistor 113 still has a non-zero impedance when its temperature is elevated, thereby unnecessarily consuming power. Thus, the switching unit 114 connected in parallel with the thermistor 113 may be further provided. When the ballast stabilizer 20 outputs normal power, the switching unit 114 may be switched on to bypass the thermistor 113 and remove power consumed in the thermistor 113.

In detail, the switching unit 114 may be switched off when a potential difference between both ends of the thermistor 113 is greater than a pre-set value (i.e., the switching unit 114 may be open), and may be switched on when the potential difference between both ends of the thermistor 113 is smaller than the pre-set value (i.e., the switching unit 114 may be closed to enable current flow therethrough). Alternatively, the switching unit 114 may be switched off during a pre-set period of time or may be switched on when the pre-set period of time has lapsed. However, the present inventive concept is not limited thereto.

FIG. 4 illustrates an embodiment in which the thermistor 113 is replaced by a resistor unit 115 and a switching unit 116 connected in parallel with the resistor unit 115. Referring to FIG. 4, the light source driving device 300 may include the resistor unit 115 connected in series with the coil Co1 between the external input terminals 111a and 111b of the primary winding part 111, and the switching unit 116 connected in parallel with the resistor unit 115.

The impedance of the resistor unit 115 may be set to allow or cause the ballast stabilizer 20 to output ignition power. For example, the resistor unit 115 may have impedance ranging from tens of kΩ to hundreds of kΩ (e.g., 10 kΩ to 900 kΩ). The switching unit 116 may be switched off (i.e., placed in a non-conducting state) when a potential difference between both ends of the resistor unit 115 is greater than a pre-set value and may be switched on (i.e., placed in a conducting state) when the potential difference between both ends of the resistor unit 115 is smaller than the pre-set value. Alternatively, the switching unit 116 may be switched off during a pre-set period of time or may be switched on when the pre-set period of time has lapsed.

Figure 5:
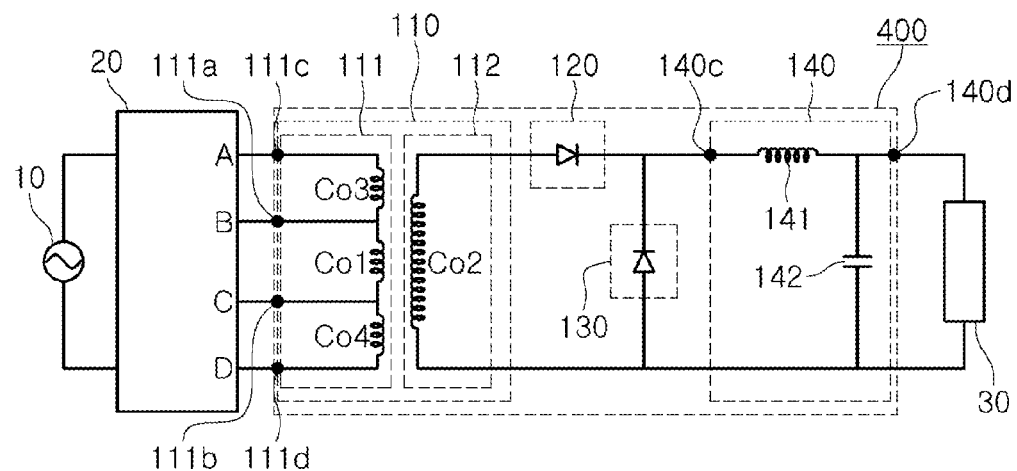

FIG. 5 is a circuit diagram illustrating a light source driving device 400 according to a different embodiment of the present inventive concepts.

The ballast stabilizer 20 may monitor a voltage between the first and second output terminals A and B and a voltage between the third and fourth output terminals C and D. Ballast stabilizer 20 may monitor for a predetermined potential difference, e.g., a potential difference of approximately 10V, according to types. Namely, such a configuration is based on a consideration of a filament installed in an electrode of a fluorescent lamp. When a predetermined potential difference between the first and second output terminals A and B and a predetermined potential difference between the third and fourth output terminals C and D do not reach the predetermined potential difference, the ballast stabilizer 20 may recognize that the filament of the fluorescent lamp has an error and may malfunction such as not outputting power.

Thus, referring to FIG. 5, the primary winding part 111 of the light source driving device 400 according to the present embodiment further includes third and fourth external input terminals 111c and 111d, and may further include first and second potential difference generating units generating a potential difference between the first external input terminal 111a and the third external input terminal 111c and between the second external input terminal 111b and the fourth external input terminal 111d. In the present embodiment, the first and second potential difference generating units may be configured as coils, respectively (hereinafter, respectively referred to as 'first and second sub-coils Co3 and Co4'). However, the present inventive concepts are not limited thereto, and any means may correspond to the potential difference generating units according to the present embodiment as long as a potential difference may be generated between the first external input terminal 111a and the third external input terminal 111c and between the second external input terminal 111b and the fourth external input terminal 111d.

The first, second, third, and fourth external input terminals 111a, 111b, 111c, and 111d may respectively be connected to the second, third, first, and fourth output terminals B, C, A, and D, and the first sub-coil Co3 disposed between the first external input terminal 111a and the third external input terminal 111c may generate a potential difference between the first and second output terminals A and B of the ballast stabilizer 20. Also, the second sub-coil Co4 disposed between the second external input terminal 111b and the fourth external input terminal 111d may generate a potential difference between the third and fourth output terminals C and D of the ballast stabilizer 20, so that the ballast stabilizer 20 may not malfunction.

Also, when the potential difference generating units are implemented as sub-coils according to the present embodiment, the coil Co2 formed in the secondary winding part 112 of the transformer unit 110 may be electromagnetically coupled to the first sub-coil Co3, the second sub-coil Co4, and the coil Co1. The coil Co2 may have an impedance level set to allow the ballast stabilizer 20 to output a normal amount of power to transform the applied external power, and in this case transformation efficiency can be increased.

Figure 6:
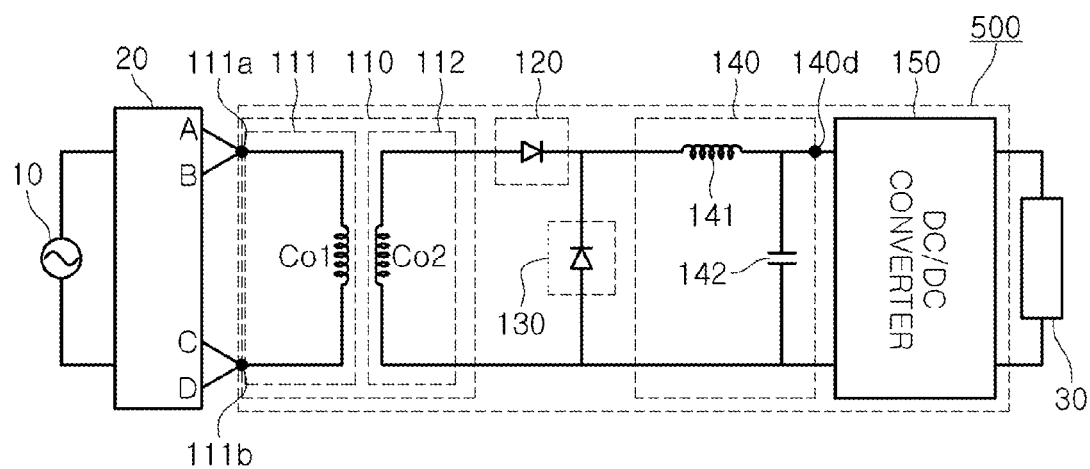
Figure 7:
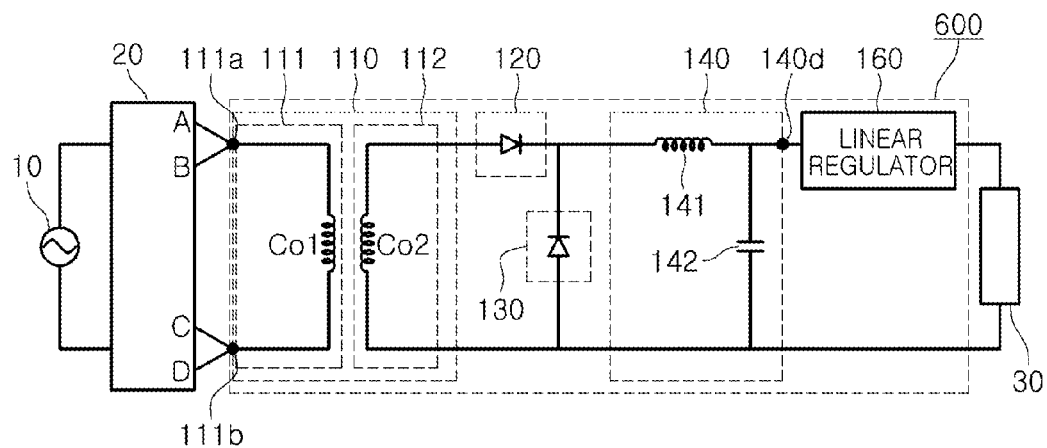

FIGS. 6 and 7 are circuit diagrams illustrating light source driving devices according to different embodiments of the present inventive concepts.

Referring to FIG. 6, a light source driving device 500 further includes a DC/DC converter 150 receiving light source driving power from the output terminal 140d of the filter unit 140 and outputting regulated light source driving power to the external light source 30. The DC/DC converter 150 may be configured according to any one of schemes such as boost, buck, buck-boost, and flyback, but the present inventive concept is not limited thereto.

Referring to FIG. 7, a light source driving device 600 further includes a linear regulator 160 receiving light source driving power from the output terminal 140d of the filter unit 140 and outputting regulated light source driving power to the external light source 30.

The light source driving devices according to the embodiments of FIGS. 6 and 7 may be able to output regulated light source driving power by which the external light source 30 can be effectively driven.

Figure 34A:
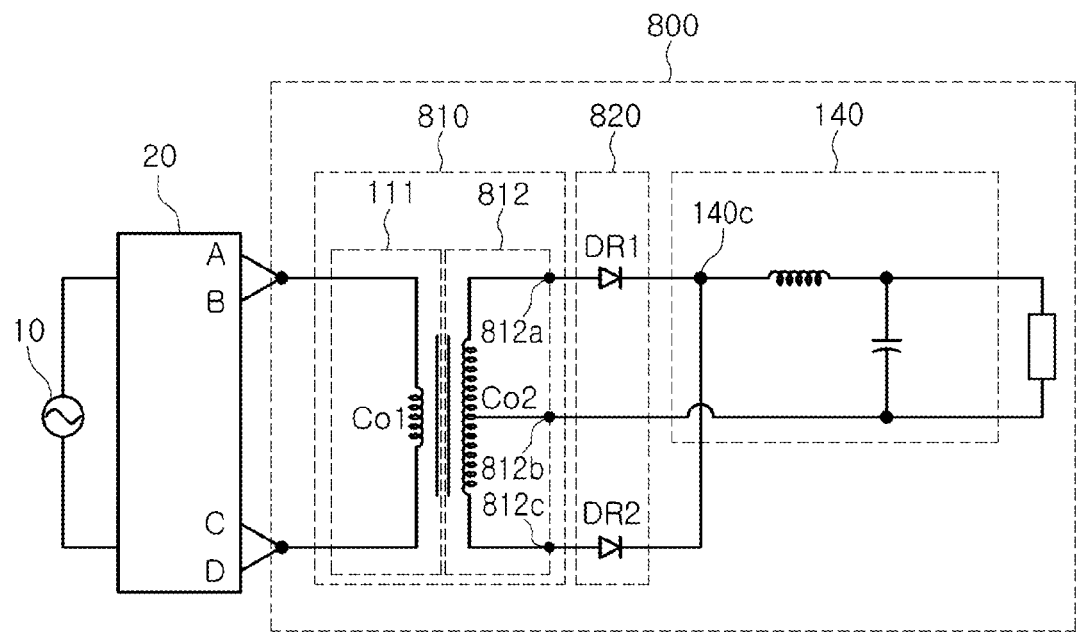
FIGS. 34A through 34C are circuit diagrams illustrating a light source driving device and operational states of the light source driving device according to a different embodiment of the present inventive concepts.

FIG. 34A is a circuit diagram illustrating a light source driving device 800 according to a different embodiment of the present inventive concepts.

In the light source driving device 800, the transformer unit 110 and rectifying circuit 120 of device 100 have been modified in order to provide full-wave rectification of the AC signal received from the ballast stabilizer 20 at the primary winding part 111 of the transformer unit 810. Specifically, the transformer unit 810 of the light source driving device 800 has a primary winding part 111 that is substantially similar to the primary winding unit 111 of device 100. However, the secondary winding unit 112 of device 100 is replaced with a secondary winding unit 812 that includes two different output windings or coils Co2' and Co2".

The two coils Co2' and Co2" may be disposed end-to-end as shown in FIG. 34A, to each correspond to one half of the coil Co2 of FIG. 1 and thereby be electromagnetically coupled to the primary winding part 111. Alternatively, the two coils Co2' and Co2" may be wound together to each extend along the entire length of the coil Co1 of the primary winding part 111, and to thereby be electromagnetically coupled to the primary winding part 111.

The secondary winding unit 812 has three output terminals 812a, 812b, and 812c disposed such that coil Co2' is coupled between terminals 812a and 812b while coil Co2" is coupled between terminals 812b and 812c. Further the coils Co2' and Co2" are electromagnetically coupled to the primary winding part 111 such that when a current flowing through the primary winding part 111 induces a current to flow in a first direction in the coil Co2' (e.g., a current flowing out of terminal 812b and into terminal 812a), the same current flowing through the primary winding part 111 induces a current to flow in the opposite direction in the coil Co2" (e.g., a current flowing into terminal 812b and out of terminal 812c). Conversely, a current flowing in the opposite direction through primary winding part 111 induces a current to flow is a second direction in the coil Co2' (e.g., a current flowing into terminal 812b and out of terminal 812a) opposite to the first direction, and induces a current to flow in the opposite direction in the coil Co2" (e.g., a current flowing out of terminal 812b and into terminal 812c).

In the light source driving device 800, the rectifying circuit 120 of device 100 has further been modified to be a rectifying circuit 820 including two diodes DR1 and DR2. The rectifying circuit 820 provides full-wave rectification. Each of the diodes DR1 and DR2 is coupled between a different terminal of the secondary winding part 812 and the input terminal 140c of the output circuit. As shown in FIG. 34A, the diode DR1 is thus coupled between terminals 812a and 140c, and is operative to allow current flow out of terminal 812a of the secondary winding part to the filter unit 140. The diode DR2 is coupled between terminals 812c and 140c, and is operative to allow current flow out of terminal 812c of the secondary winding part to the filter unit 140. The terminal 812b of the secondary winding part is coupled to a second input terminal of the filter unit 140, and provides a return path for current flowing out of the coils through diodes DR1 and DR2.

The light source driving device 800 does not require the use of an open loop preventing unit in order to function properly. While an open loop preventing unit substantially similar to loop preventing unit 130 of device 100 can be used in device 800, none is shown in FIG. 34A.

Figure 34B:
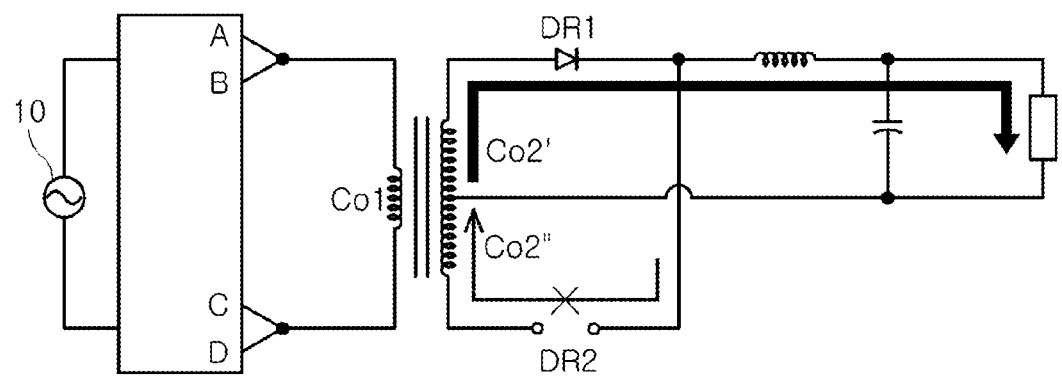
Figure 34C:
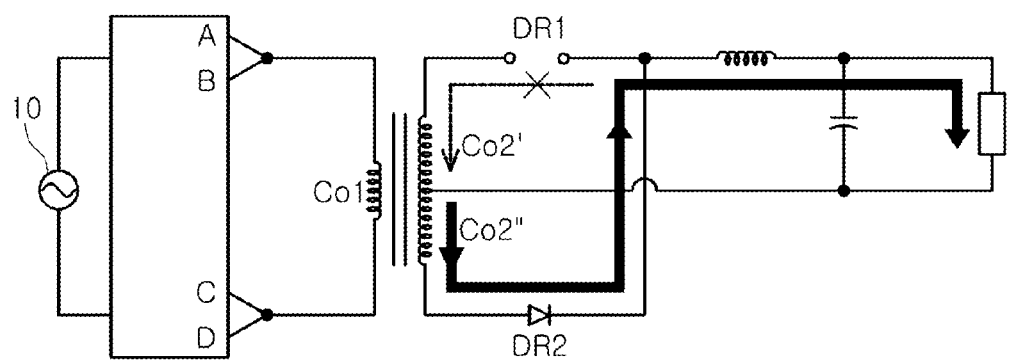

Operation of the light source driving device 800 is explained in relation to FIGS. 34B and 34C. During a first portion of a cycle of an AC signal driving the primary winding unit 111, electromagnetic coupling between the primary and secondary winding units 111 and 812 induce current flow through the secondary winding unit 812 in a first direction illustratively shown by the arrows in FIG. 34B. The induced current during the first portion of the cycle, however, flows in a direction opposite to the direction of conduction of diode DR2. Diode DR2 is therefore in a non-conducting state in which the diode does not allow current flow, and is illustratively shown in FIG. 34B as an open circuit. Diode DR1, however, allows the current to flow during the first portion of the cycle. As a result, induced current flow through diode DR1 is provided through the filter unit 140 for driving the external light source 30.

During a second portion of the cycle of the AC signal driving the primary winding unit 111, the direction of current flow reverses. Specifically, during the second portion of the cycle, electromagnetic coupling between the primary and secondary winding units 111 and 812 induces current flow through the secondary winding unit 812 in a second direction opposite to the first direction. The second direction is illustratively shown by the arrows in FIG. 34C. The induced current during the second portion of the cycle, however, flows in a direction opposite to the direction of conduction of diode DR1. Diode DR1 is therefore in a non-conducting state in which the diode does not allow current flow, and is illustratively shown in FIG. 34C as an open circuit. Diode DR2, however, allows the current to flow during the second portion of the cycle. As a result, induced current flow through diode DR2 is provided through the filter unit 140 for driving the external light source 30.

In operation, the light source driving device 800 thus provides full-wave rectification, and is thus configured to drive the external light source 30 during both portions of the cycle of the AC signal driving the primary winding unit 111.

Figure 35A:
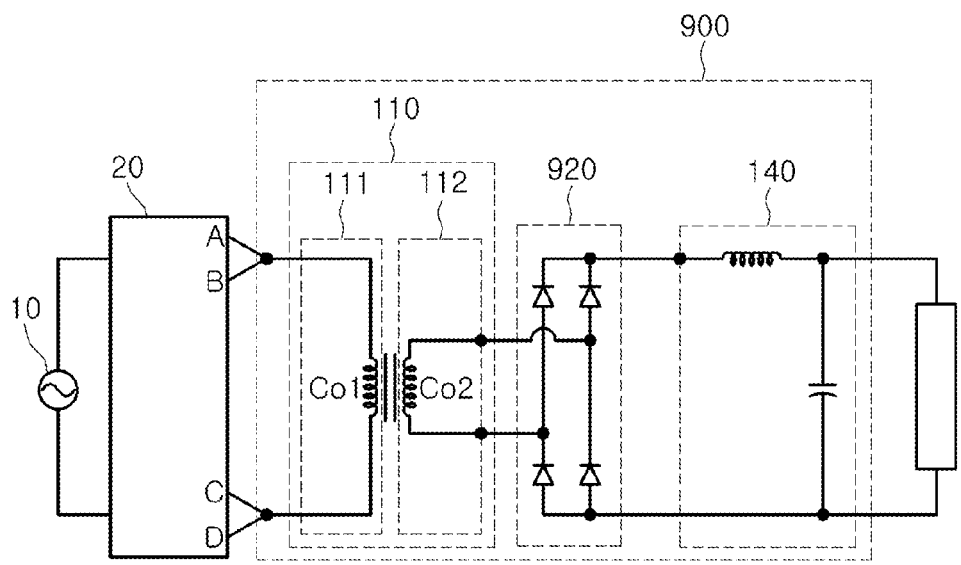
FIGS. 35A and 35B are circuit diagrams illustrating light source driving devices according to different embodiments of the present inventive concepts.

FIG. 35A is a circuit diagram illustrating a light source driving device 900 according to a different embodiment of the present inventive concepts.

In the light source driving device 900, the rectifying circuit 120 of device 100 has been modified in order to provide full-wave rectification of the AC signal received from the ballast stabilizer 20 and transformed by the transformer unit 110. Specifically, the rectifying circuit 120 has been replaced with a diode bridge circuit 920 operative to provide full-wave rectification. Thus, the signal provided across coil Co2 at the output of the transformer unit 110 is provided to the diode bridge circuit 920. The diode bridge circuit 920 is operative to provide full-wave rectification of the signal received from the transformer unit 110, and to provide the full-wave rectified signal to the filter unit 140 for driving the external light source 30.

In operation, the light source driving device 900 provides full-wave rectification, and is thus configured to drive the external light source 30 during both portions of the cycle of the AC signal driving the primary winding unit 111. The light source driving device 900 does not require the use of an open loop preventing unit in order to function properly. While an open loop preventing unit substantially similar to loop preventing unit 130 of device 100 can be used in device 900, none is shown in FIG. 35A.

Figure 35B:
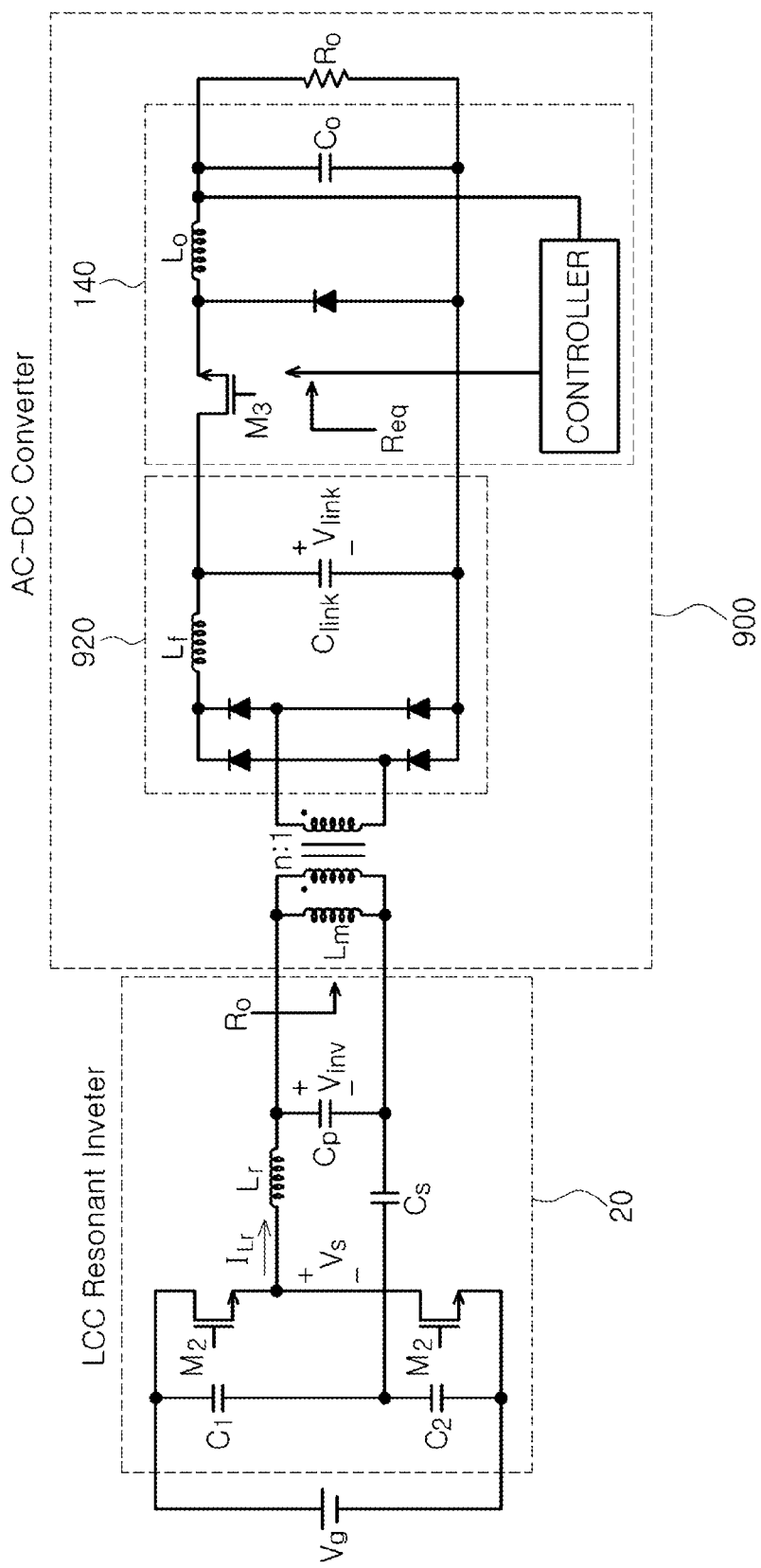

FIG. 35B is a further circuit diagram illustrating one embodiment of the light source driving device 900 of FIG. 34A according to the present inventive concepts. In the embodiment of FIG. 35B, additional details are provided regarding the circuit structure of the ballast stabilizer 20. Additionally, the rectifier circuit 920 is illustratively shown as including an L-C filter, while the filter circuit 140 is illustratively shown as including a transistor switch and controller. The circuitry shown in the embodiment of FIG. 35B may provide certain advantages over the light source driving device 900 of FIG. 35A.

FIGS. 8A, 8B, 9A, and 9B are graphs showing operation performance of the light source driving device according to an embodiment of the present inventive concept.

In FIGS. 8A, 8B, 9A, and 9B, K represents a voltage output by the ballast stabilizer, L represents a voltage of light source driving power output by the light source driving device, and M represents a current of light source driving power output by the light source driving device.

Figure 8A:
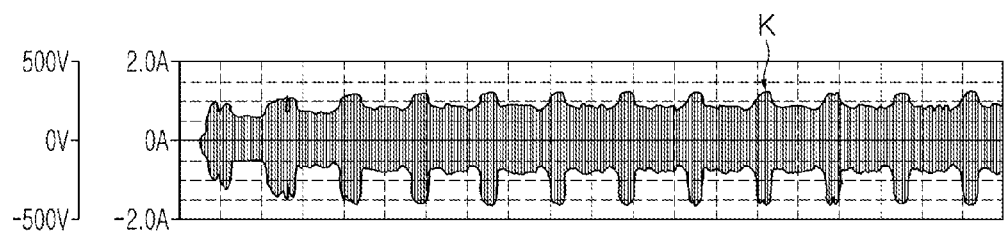
FIGS. 8A and 8B are graphs showing operation performance of the light source driving device according to the embodiment of FIG. 1.
Figure 8B:
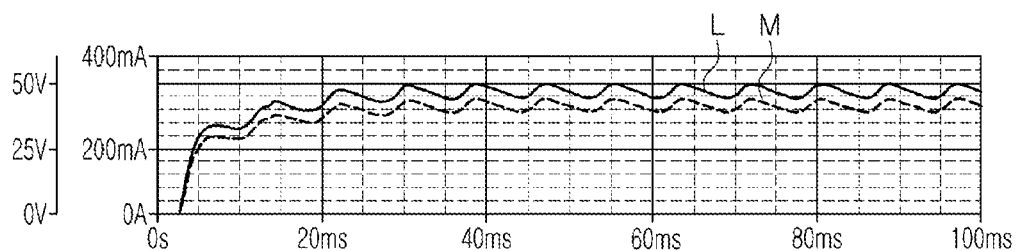

First, FIGS. 8A and 8B are graphs showing operations of the light source driving device 100 according to the embodiment of FIG. 1. FIGS. 8A and 8B have the same x-axis scale.

Referring to FIG. 8A, it can be seen that the ballast stabilizer outputs normal power having a voltage of a maximum of about 250V. Thus, light source driving power output by the light source driving device 100 is measured as shown in FIG. 8B. According to FIG. 8B, a voltage of the light source driving power is measured to be about 45V, but this may be a feature that can be easily changed through design by setting a winding ratio between coils Co1 and Co2 of the primary winding part and the secondary winding part.

Figure 9A:
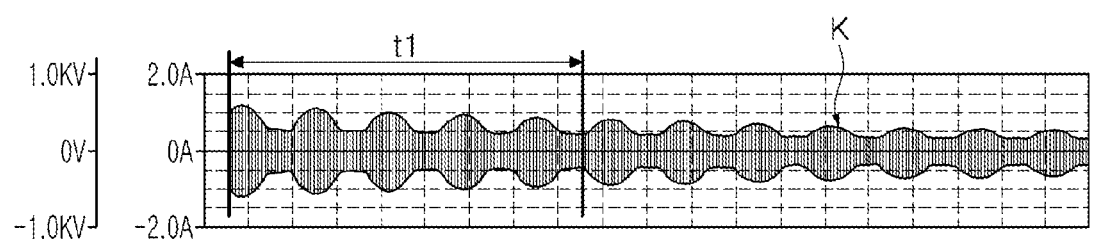
FIGS. 9A and 9B are graphs showing operation performance of the light source driving device according to the embodiment of FIG. 3.
Figure 9B:
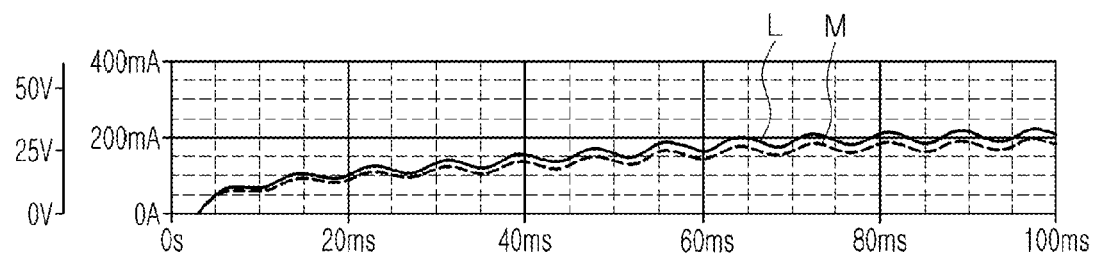

FIGS. 9A and 9B are graphs showing operations of the light source driving device 200 according to the embodiment of FIG. 3. FIGS. 9A and 9B have the same x-axis scale. In this case, the operations correspond to a case in which the switching unit 114 connected to the thermistor 113 in parallel is not included in the embodiment of FIG. 3.

Referring to FIG. 9A, it can be seen that the ballast stabilizer outputs ignition power (t1 section) at the time of initial driving, and as impedance of the thermistor is decreased, the ballast stabilizer subsequently outputs normal power (following the end of the t1 section). Thus, light source driving power output by the light source driving device 200 is measured as shown in FIG. 9B. Referring to FIG. 9B, it can be seen that, although ignition power is input, stable light source driving power is output.

Figure 10:
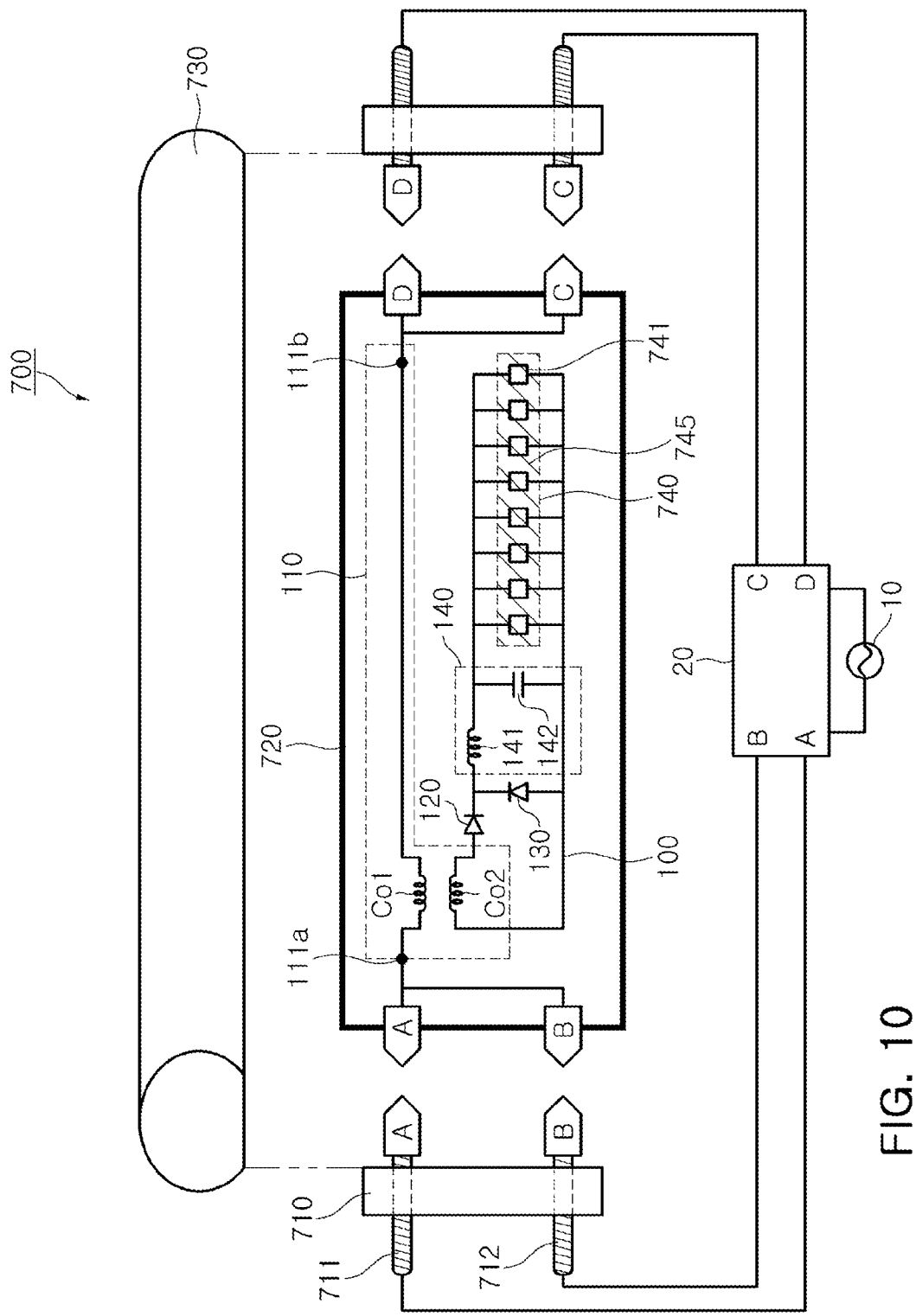
FIG. 10 is a view illustrating an illuminating apparatus according to an embodiment of the present inventive concepts.
Figure 11:
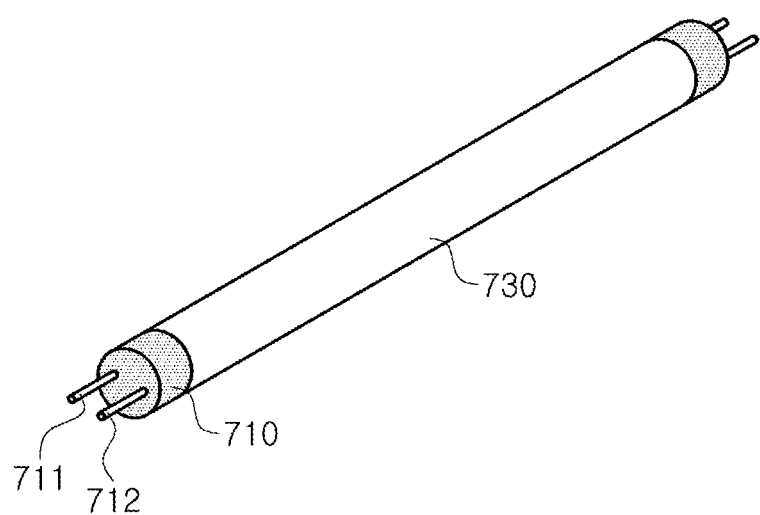
FIG. 11 is a perspective view illustrating an assembled state of the illuminating apparatus of FIG. 10.

FIG. 10 is a view illustrating an illuminating apparatus according to an embodiment of the present inventive concepts, and FIG. 11 is a perspective view illustrating an assembled state of the illuminating apparatus of FIG. 10.

Referring to FIG. 10, an illuminating apparatus 700 according to an embodiment of the present inventive concepts includes a socket 710 including an input terminal for receiving external power from the ballast stabilizer 20, a housing 730 coupled to the socket 710, a plate 720 installed within the housing 730 and including a light source driving device, and a light source unit 740 mounted on the plate 720.

The socket 710 includes two input terminals 711 and 712 and may be formed in both end portions of the illuminating apparatus 700. In this case, a total of four input terminals 711 and 712 are provided in the socket 710 and electrically connected to correspond to the first to fourth output terminals A, B, C, and D, respectively. However, the present inventive concepts are not limited thereto and configurations of the socket 710 may be variously modified.

Figure 12A:
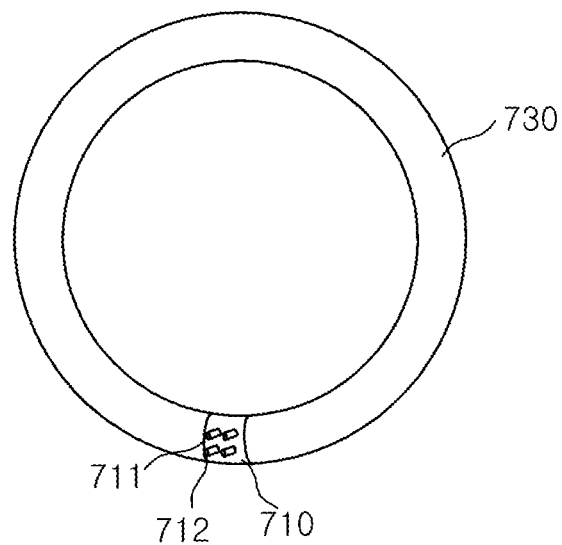
FIGS. 12A and 12B are views illustrating various shapes of housings employable in an illuminating apparatus according to various embodiments of the present inventive concepts.
Figure 12B:
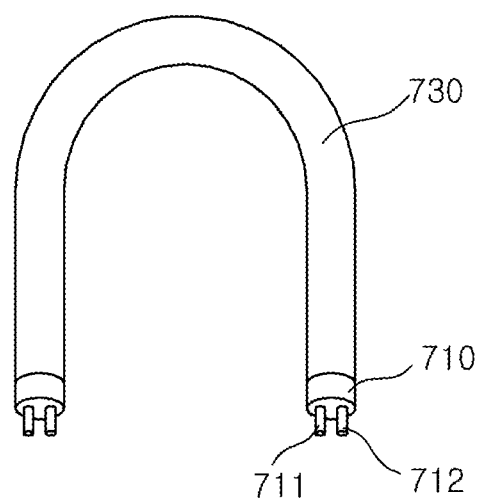

The housing 730, serving to protect the light source unit 740 and the light source driving device 100 against the outside, may be made of a transparent or translucent material to allow light output from the light source unit 740 to be emitted outwardly therethrough. Also, the housing 730 may have a bar-like shape to provide an exterior similar to that of a general fluorescent lamp. However, the present inventive concepts are not limited thereto and the housing 730 may have various other shapes such as an annular (circular) shape or a semi-circular (U-like) shape as illustrated in FIGS. 12A and 12B, respectively.

The light source unit 740 may include at least one light emitting diode (LED) 741 receiving light source driving power from the light source driving device 100. The LED may be a blue LED emitting blue light, or any other type of colored LED. More generally, the light source unit 740 includes a plurality of light emitting diodes 741. A wavelength conversion unit 745 can optionally be disposed on the LED(s) 741. The wavelength conversion unit 745 may include a wavelength conversion material excited by light output from the LED(s) 741 to emit light having a converted wavelength.

The plate 720 is provided in a region in which the light source unit 740 is mounted. The plate 720 may be made of a metal having high heat conduction quality to enhance an efficiency of heat dissipation and the plate 720 may have reflective characteristic to enhance a light emitting efficiency.

The LED(s) 741 of light source unit 740 may be any of a variety of semiconductor device emitting light having a predetermined wavelength (or range of wavelengths) when an electrical signal is applied thereto. The LED(s) 741 may be any of LEDs 741-1 through 741-5 illustrated in and described in relation to each of FIGS. 13 through 17.

<First Embodiment of LED 741>

Figure 13:
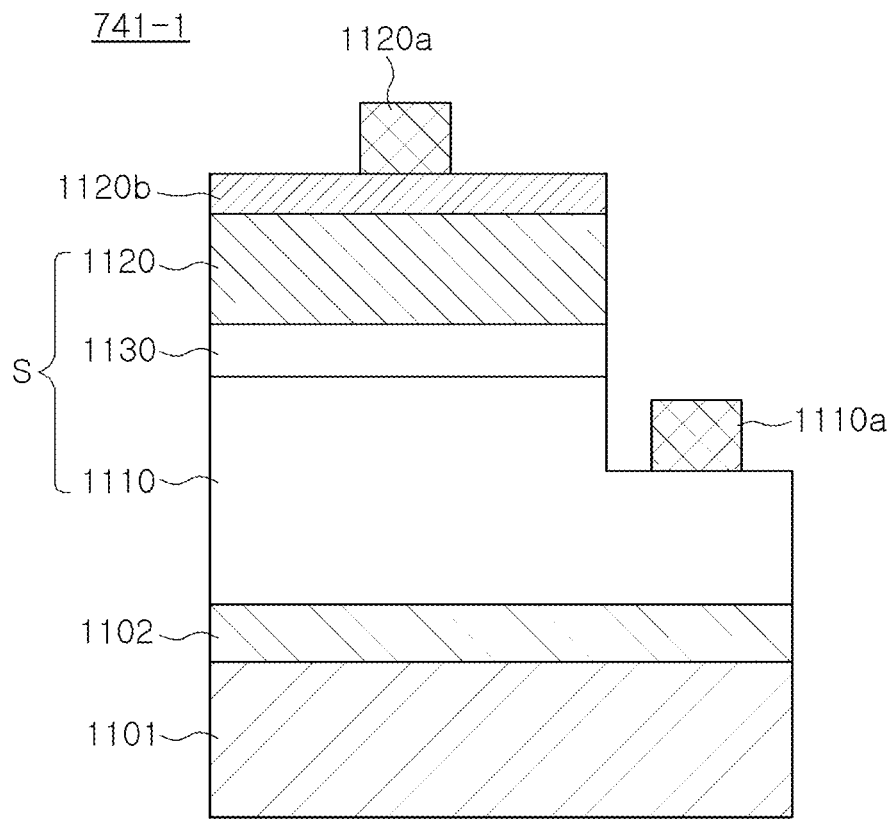
FIGS. 13 through 17 are views illustrating various examples of LEDs employable in an illuminating apparatus according to embodiments of the present inventive concepts.

First, referring to FIG. 13, the LED 741 according to an embodiment of the present inventive concepts may be provided as an LED chip 741-1 including a light emitting laminate S formed on a semiconductor substrate 1101.

As the substrate 1101, an insulating substrate, a conductive substrate, or a semiconductor substrate may be used as necessary. For example, the substrate 1101 may be made of sapphire, SiC, Si, MgAl$_2$O$_4$, MgO, LiAlO$_2$, LiGaO$_2$, GaN, AlN, AlGaN. Among them, a sapphire substrate, a silicon carbide (SiC) substrate, or the like, is commonly used as a heterogeneous substrate. In the case of a sapphire substrate, sapphire is a crystal having Hexa-Rhombo R3c symmetry, of which lattice constants in c-axis and a-axis directions are approximately 13.001 Å and 4.758 Å, respectively, and has a C-plane (0001), an A-plane (1120), an R-plane (1102), and the like. In this case, a nitride thin film may be relatively easily grown on the C-plane of the sapphire crystal, and because sapphire crystal is stable at high temperatures, the sapphire substrate is commonly used as a nitride growth substrate.

A silicon (Si) substrate may also be employed as a heterogeneous substrate. Since a silicon (Si) substrate is more appropriate for increasing a diameter of a semiconductor wafer and is relatively low in price, the Si substrate may be used to facilitate mass-production. Further, when using a Si substrate, a technique of inducing a difference in lattice constants between the silicon substrate having (111) plane as the substrate surface and GaN to a degree of 17% can be used to suppress the generation of crystal defects due to the difference between the lattice constants. Also, because a difference in coefficients of thermal expansion between silicon and GaN is approximately 56%, a technique of suppressing bowing of a wafer generated due to the difference in the coefficients of thermal expansion can further be used to prevent bowing of the wafer. Bowed wafers may result in cracks in the GaN thin film and make it difficult to control processes to increase dispersion of emission wavelengths of light in the same wafer, or the like. The silicon substrate can absorb light generated in the GaN-based semiconductor, and thereby lower external quantum yield of the LED 741-1. Thus, the substrate 1101 may be removed and a support substrate such as a silicon substrate, a germanium substrate, an SiAl substrate, a ceramic substrate, a metal substrate, or the like, including a reflective layer, may be additionally or alternatively formed to be used as necessary.

Of course, the substrate 1101 of the LED 741-1 employed in the present embodiment is not limited to a heterogeneous substrate, so a GaN substrate, a homogeneous substrate, or the like, may alternatively be used. A GaN substrate does not have great mismatch in lattice constants and coefficients of thermal expansion with a GaN material used to form the light emitting laminate S, so the use of a GaN substrate allows a high quality semiconductor thin film to be grown thereon.

Meanwhile, when using a heterogeneous substrate, defects such as dislocation may be increased due to a difference in lattice constants between a substrate material and a thin film material. Also, differences in coefficients of thermal expansion between the substrate material and the thin film material can cause bowing of the substrate when a temperature is changed, and bowing in the substrate may cause the formation of cracks in the thin film. These problems may be reduced by using a buffer layer 1102 formed between the substrate 1101 and the GaN-based light emitting laminate S.

Thus, in the present embodiment, the LED 741-1 can further include the buffer layer 1102 formed between the substrate 1101 and the light emitting laminate S. The buffer layer 1102 may serve to adjust or reduce a degree of bowing of the substrate when an active layer 1130 is grown, so as to reduce wavelength distribution of a wafer.

The buffer layer 1102 may be made of Al$_x$In$_y$Ga$_{1-x-y}$N (0≤x≤1, 0≤y≤1), in particular, GaN, AlN, AlGaN, InGaN, or InGaAlN, and a material such as ZrB$_2$, HfB$_2$, ZrN, HfN, TiN, or the like, may also be used as necessary. Also, the buffer layer 1102 may be formed of a plurality of layers, or may be formed of a material having a gradually changing composition (e.g., such that a composition of the buffer layer 1102 changes depending on the location or depth of the layer).

Also, when employing a silicon substrate as the substrate 1101, silicon has a coefficient of thermal expansion significantly different (about 56%) from that of GaN. Thus, when growing a GaN-based thin film on the silicon substrate, the GaN thin film is generally grown at a high temperature and is subsequently cooled to room temperature. Tensile stress can thus be generated and applied to the GaN thin film during the cooling due to the difference in the coefficients of thermal expansion between the silicon substrate and the GaN thin film, thereby generating cracks. In order to prevent the generation of cracks, a method of growing the GaN thin film can be used such that compressive stress is applied to the GaN thin film while the GaN thin film is being grown so as to compensate for tensile stress. In addition, in order to restrain the generation of defects due to a difference in lattice constants, the buffer layer 1102 having a composite structure may be used. In this case, the buffer layer 1102 may serve to control stress for restraining warpage as well as for controlling the formation of defects.

For example, first, an AlN layer is formed as the buffer layer 1102 on the substrate 1101. In this case, a material not including gallium (Ga) may be used in order to prevent a reaction between silicon (Si) and gallium (Ga). The AlN layer is grown at a temperature ranging from 400° C. to 1,300° C. by using an aluminum (Al) source and a nitrogen (N) source. Here, an AlGaN intermediate layer may be inserted between a plurality of AlN layers to control stress, as necessary, to form the buffer layer 1102 having a composite or multi-layer structure.

Meanwhile, the substrate 1101 may be completely or partially removed or patterned during a fabrication process in order to enhance optical properties or electrical characteristics of the LED before or after the light emitting laminate S structure is grown. For example, in the case of a sapphire substrate, the substrate may be separated by irradiating a laser on an interface between the substrate 1101 and the buffer layer 1102 or on an interface between the substrate 1101 and the light emitting laminate S. In the case of a silicon substrate or a silicon carbide substrate, the substrate may be removed through a method of polishing/etching, or the like.

Also, in removing the substrate 1101, a different support substrate may be used to support the light emitting laminate structure S. In such a case, the support substrate may be attached to the opposite side of the original growth substrate by using a reflective metal. A reflective structure may be inserted into a middle portion of a bonding layer to enhance light efficiency of the LED 741-1.

Referring to substrate patterning, an uneven surface or a sloped surface may be formed on a main surface (one surface or both surfaces) or a lateral surface of the substrate 1101 before or after the growth of the light emitting laminate S to enhance light extraction efficiency. A size of the pattern may be selected from within the range of 5 nm to 500 μm, and any pattern may be employed, as long as it can enhance light extraction efficiency as a regular or an irregular pattern. The pattern may have various shapes such as a columnar shape, a peaked shape, a hemispherical shape, a polygonal shape, and the like.

The light emitting laminate S includes first and second conductivity-type semiconductor layers 1110 and 1120 and the active layer 1130 interposed therebetween. The first and second conductivity-type semiconductor layers 1110 and 1120 may have a unilayer structure, or the first and second conductivity-type semiconductor layers 1110 and 1120 may have a multilayer structure including layers having different compositions, thicknesses, and the like. For example, the first and second conductivity-type semiconductor layers 1110 and 1120 may include a carrier injection layer for improving electron and hole injection efficiency, or may have various types of superlattice structures.

The first conductivity-type semiconductor layer 1110 may further include a current spreading layer in a region adjacent to the active layer 1130. The current spreading layer may have a structure in which a plurality of $In_xAl_yGa_{(1-x-y)}N$ layers having different compositions or different impurity contents are iteratively laminated or have an insulating material layer partially formed therein.

The second conductivity-type semiconductor layer 1120 may further include an electron blocking layer in a region adjacent to the active layer 1130. The electron blocking layer may have a structure in which a plurality of $In_xAl_yGa_{(1-x-y)}N$ layers having different compositions are laminated or may have one or more layers including $Al_yGa_{(1-y)}N$. The electron blocking layer has a bandgap wider than that of the active layer 1130, thus preventing electrons from being transferred over the second conductivity-type (e.g., p-type) semiconductor layer 1120.

The light emitting laminate S may be formed by using metal-organic chemical vapor deposition (MOCVD). In order to fabricate the light emitting laminate S, an organic metal compound gas (e.g., trimethyl gallium (TMG), trimethyl aluminum (TMA)) and a nitrogen-containing gas (ammonia ($NH_3$), or the like) are supplied to a reaction container in which the substrate 1101 is installed as the substrate 1101 is maintained at a high temperature ranging from 900° C. to 1,100° C. While a gallium nitride-based compound semiconductor is being grown, an impurity gas is supplied as necessary to laminate the gallium nitride-based compound semiconductor as an undoped n-type or p-type semiconductor. Silicon (Si) is an n-type impurity, and p-type impurities includes zinc (Zn), cadmium (Cd), beryllium (Be), magnesium (Mg), calcium (Ca), barium (Ba), and the like. Among them, magnesium (Mg) and zinc (Zn) are commonly used.

Also, the active layer 1130 disposed between the first and second conductivity-type semiconductor layers 1110 and 1120 may have a multi-quantum well (MQW) structure in which a quantum well layer and a quantum barrier layer are alternately laminated. For example, in the case of a nitride semiconductor, a GaN/InGaN structure may be used, or a single quantum well (SQW) structure may also be used.

In the present embodiment, an ohmic-contact layer 1120b may be formed on the second conductivity-type semiconductor layer 1120. The ohmic-contact layer 1120b may have a relatively high impurity concentration, so as to have low ohmic-contact resistance, to lower an operating voltage of the element, and to enhance element characteristics. The ohmic-contact layer 1120b may be formed of a GaN layer, a InGaN layer, a ZnO layer, or a graphene layer, for example.

The first or second electrodes 1110a and 1120a are electrically connected to the first and second conductivity-type semiconductor layers 1110 and 1120, respectively. The electrodes 1110a and 1120a may be made of a material such as silver (Ag), nickel (Ni), aluminum (Al), rhodium (Rh), palladium (Pd), iridium (Ir), ruthenium (Ru), magnesium (Mg), zinc (Zn), platinum (Pt), gold (Au), or the like, and may have a structure including two or more layers such as Ni/Ag, Zn/Ag, Ni/Al, Zn/Al, Pd/Ag, Pd/Al, Ir/Ag. Ir/Au, Pt/Ag, Pt/Al, Ni/Ag/Pt, or the like.

The LED chip 741-1 illustrated in FIG. 13 may have a structure in which the first and second electrodes 1110a and 1120a face in the same direction as a light extraction surface, for example. However, conversely, the first and second electrodes 1110a and 1120a may also be mounted to face in a direction opposite to the light extraction surface, for example for use in a flipchip structure.

<Second Embodiment of LED 741>

Figure 14:
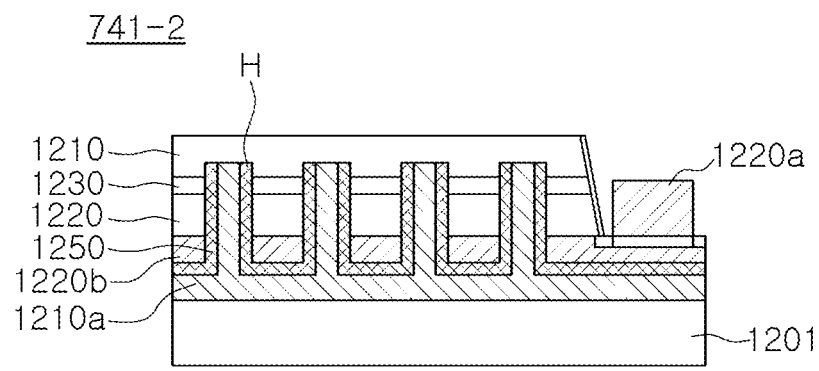

FIG. 14 illustrates a different type of LED 741-2 employable as the LED 741 according to an embodiment of the present inventive concepts.

In the case of LED 741-2, current spreading efficiency and heat dissipation efficiency in a chip unit of an illuminating apparatus are improved. Additionally, the LED 741-2 can be formed as a large high output LED.

Referring to FIG. 14, the LED 741-2 according to the present embodiment includes a first conductivity-type semiconductor layer 1210, an active layer 1230, a second conductivity-type semiconductor layer 1220, a second electrode layer 1220b, an insulating layer 1250, a first electrode layer 1210a, and a substrate 1201, laminated sequentially. In order to be electrically connected to the first conductivity-type semiconductor layer 1210, the first electrode layer 1210a is formed to extend through one or more contact holes H extending through the active layer 1230, second conductivity-type semiconductor layer 1220, and the second electrode layer 1220b from one surface of the first electrode layer 1210a to at least a partial region of the first conductivity-type semiconductor layer 1210. Each contact holes H is electrically insulated from the second conductivity-type semiconductor layer 1220 and the active layer 1230 by the insulating layer 1250. However, the first electrode layer 1210a is not an essential element in the present embodiment.

Each contact hole H extends from an interface of the first electrode layer 1210a, passing through the second electrode layer 1220b, the second conductivity-type semiconductor layer 1220, and the active layer 1230, to the interior of the first conductivity-type semiconductor layer 1210. The contact hole H extends at least to an interface between the active layer 1230 and the first conductivity-type semiconductor layer 1210 and, preferably, extends to an interior portion of the first conductivity-type semiconductor layer 1210. However, the contact hole H is formed for electrical connectivity to and current spreading of the first conductivity-type semiconductor layer 1210, so the purpose of the contact hole H is achieved when it is in contact with the first conductivity-type semiconductor layer 1210. Thus, it is not necessary for the contact hole H to extend through the first conductivity-type semiconductor layer 1210 to an upper external surface of the first conductivity-type semiconductor layer 1210.

The second electrode layer 1220b formed on the second conductivity-type semiconductor layer 1220 may be selectively made of a material among silver (Ag), nickel (Ni), aluminum (Al), rhodium (Rh), palladium (Pd), iridium (Ir), ruthenium (Ru), magnesium (Mg), zinc (Zn), platinum (Pt), gold (Au), and the like. The material forming the second electrode layer 1220b can be selected in consideration of a light reflecting function and an ohmic-contact function with the second conductivity-type semiconductor layer 1220. The second electrode layer 1220b may be formed by using a process such as sputtering, deposition, or the like.

The contact hole H may have a form penetrating the second electrode layer 1220b, the second conductivity-type semiconductor layer 1220, and the active layer 1230 so as to extend and be connected to the first conductivity-type semiconductor layer 1210. The contact hole H may be formed through an etching process, e.g., inductively coupled plasma-reactive ion etching (ICP-RIE), or the like.

The insulating layer 1250 is formed to cover a side wall of the contact hole H and a surface of the second conductivity-type semiconductor layer 1220. In this case, at least a portion of the first conductivity-type semiconductor layer 1210 corresponding to a lower surface of the contact hole H may be exposed. The insulating layer 1250 may be formed by depositing an insulating material such as $SiO_2$, $SiO_xN_y$, or $Si_xN_y$.

A conductive via is formed by filling the contact hole H with a conductive material. Subsequently, the substrate 1201 is formed on the second electrode layer 1220b. In this structure, the substrate 1201 may be electrically connected to the first conductivity-type semiconductor layer 1210 by the conductive via.

The substrate 1201 may be made of a material including any one of Au, Ni, Al, Cu, W, Si, Se, GaAs, SiAl, Ge, SiC, AlN, $Al_2O_3$, GaN, AlGaN and may be formed through a process such as plating, sputtering, deposition, bonding, or the like.

In order to reduce contact resistance, the amount, shape, and pitch of the contact hole H, a contact area of the contact hole H with the first and second conductivity-type semiconductor layers 1210 and 1220, and the like, may be appropriately selected. The contact holes H may be arranged in various patterns or shapes (e.g., rows and columns) to improve a current flow. In the illustrated case, the conductive via formed in the contact holes H may be surrounded by the insulating layer 1250 so as to be electrically separated from the active layer 1230 and the second conductivity-type semiconductor layer 1220.

<Third Embodiment of LED 741>

In general, when the LED 741 is driven, a partial amount of energy driving the LED 741 is emitted as thermal energy. Thus, with the illuminating apparatus 700 employing the LED 741, heat dissipation should be considered. The illuminating apparatus 700 can include a heat dissipation unit such as a heat sink, or the like, and a heating problem may be more effectively managed by using one or more LED(s) 741 having low heating values. LEDs including, for example, nano-structures (hereinafter, referred to as 'nano-LED') may be used for this purpose.

Figure 15:
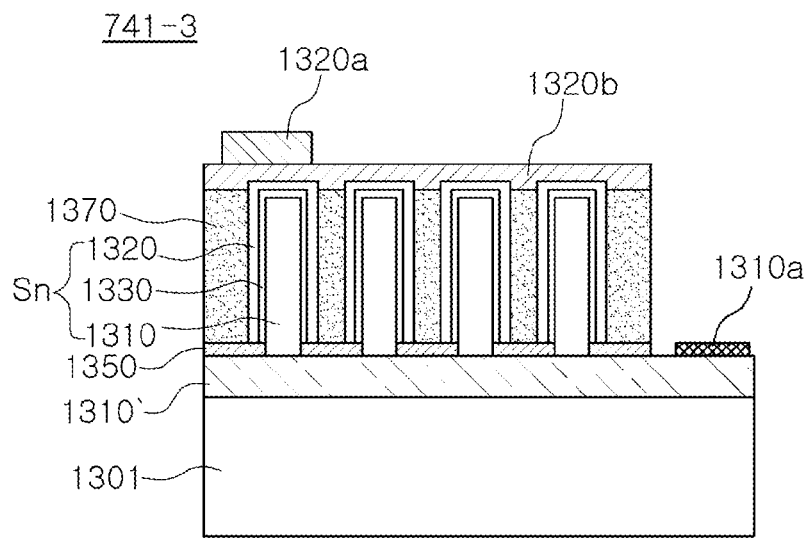

Referring to FIG. 15, an LED 741-3 includes a plurality of nano light emitting structures Sn formed on a substrate 1301. In this example, it is illustrated that each nano light emitting structure Sn has a core-shell structure including a rod structure, but the nano-light emitting structure may more generally have a different structure such as a pyramid structure.

The LED 741-3 includes a base layer 1310' formed on the substrate 1301. The base layer 1310' is a layer providing a growth surface for the nano light emitting structure Sn, and may be formed of a first conductivity-type semiconductor layer. A mask layer 1350 having an open area for the growth of the nano light emitting structure (in particular, a core) may be formed on the base layer 1310'. The mask layer 1350 may be made of a dielectric material such as $SiO_2$ or $SiN_x$.

In the nano light emitting structure Sn, a first conductivity-type nanocore 1310 is formed by selectively growing a first conductivity-type semiconductor through an open area in the mask layer 1350. An active layer 1330 and a second conductivity-type semiconductor layer 1320 are formed as shell layers on a surface of the nanocore 1310. Accordingly, the nano light emitting structure Sn may have a core-shell structure in which the first conductivity-type semiconductor is the nano-core and the active layer 1330 and the second conductivity-type semiconductor layer 1320 enclosing the nanocore are shell layers.

The LED 741-3 includes a filler material 1370 filling spaces between the nano-light emitting structures Sn. The filler material 1370 may structurally stabilize the nano light emitting structures Sn. The filler material 1370 may be made of a transparent material such as $SiO_2$, SiN, or a silicone resin, or a reflective material such as polymer (Nylon), PPA, PCE, silver (Ag), or aluminum (Al). An ohmic-contact layer 1320b may be formed on the nano light emitting structures Sn and connected to the second conductivity-type semiconductor layer 1320. The LED 741-3 includes first and second electrodes 1310a and 1320a respectively connected to the base layer 1310' formed of the first conductivity-type semiconductor and to the ohmic-contact layer 1320'.

By forming the nano light emitting structures Sn such that they have different diameters, components, and doping densities, light having two or more different wavelengths may be emitted from the single element. By appropriately adjusting light having different wavelengths, white light may be emitted without using phosphors in the single element, and light having various desired colors or white light having different color temperatures may be emitted by combining a different LED with the foregoing device or combining wavelength conversion materials such as phosphors.

The LED 741-3 using the nano light emitting structures Sn has an increased luminous efficiency provided by increasing a light emitting area through the use of the nano-structures. The LED 741-3 prevents a degradation of efficiency due to polarization by obtaining a non-polar active layer, thus improving drop characteristics.

Meanwhile, as for the LED 741-3 employed in the illuminating apparatus 700, LEDs having various structures other than the foregoing LED may be used. For example, an LED in which surface-plasmon polarities (SPP) are formed in a metal-dielectric boundary to interact with quantum well exciton to thus have significantly improved light extraction efficiency may also be advantageously used.

<Fourth Embodiment of LED 741>

Figure 16:
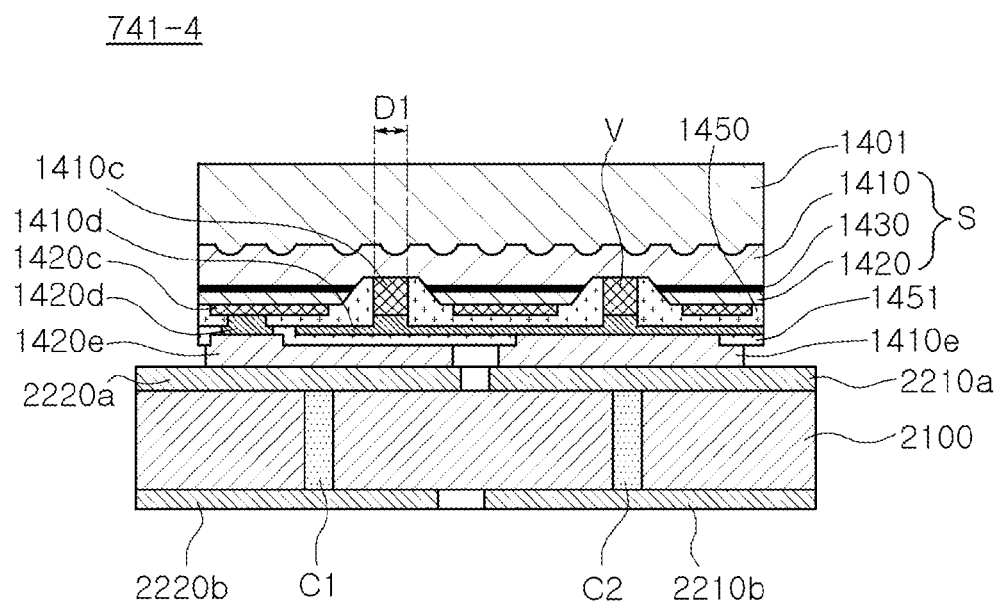

FIG. 16 illustrates another embodiment of the LED 741 employed in a form different from the foregoing example.

Referring to FIG. 16, an LED 741-4 includes a light emitting laminate S disposed in one surface of a substrate 1401, and first and second electrodes 1410c and 1420c disposed on the light emitting laminate S. The first and second electrodes 1410c and 1420c may be disposed on a side of the light emitting laminate S opposite to the side of the light emitting laminate S contacting the substrate 1401. Also, the LED 741-4 includes an insulating unit 1450 covering the first and second electrodes 1410c and 1420c. The first and second electrodes 1410c and 1420c may respectively be electrically connected to first and second electrode pads 1410e and 1420e by respective electrical connection units 1410d and 1420d.

The light emitting laminate S may include a first conductivity-type semiconductor layer 1410, an active layer 1430, and a second conductivity-type semiconductor layer 1420 sequentially disposed on the substrate 1401. The first electrode 1410c may be provided as a conductive via connected to the first conductivity-type semiconductor layer 1410. The first electrode 1410c may include a conductive via extending through the second conductivity-type semiconductor layer 1420 and the active layer 1430. The second electrode 1420c may be connected to the second conductivity-type semiconductor layer 1420.

The insulating layer 1450 has an open area exposing at least portions of the first and second electrodes 1410c and 1420c, and the first and second electrode pads 1410e and 1420e may respectively be connected to the first and second electrodes 1410c and 1420c through the open area of the insulating layer 1450.

The first and second electrodes 1410c and 1420c may be made of a conductive material having ohmic characteristics with respect to the first and second conductivity-type semiconductor layers 1410 and 1420, respectively. The first and second electrodes 1410c and 1420c may have a unilayer or multilayer structure. For example, the first and second electrodes 1410c and 1420c may be formed by depositing or sputtering one or more of silver (Ag), aluminum (Al), nickel (Ni), chromium (Cr), a transparent conductive oxide (TCO), and the like. The first and second electrodes 1410c and 1420c may be disposed in the same direction or on a same surface of the light emitting laminate S, such that the light emitting device may be mounted as a so-called flip-chip on a lead frame, or the like, as described hereinafter. In this case, the first and second electrodes 1410c and 1420c may be disposed to face in the same direction.

The first electrode 1410c may have a conductive via V connected to the first conductivity-type semiconductor layer 1410 through the second conductivity-type semiconductor layer 1420 and the active layer 1430 within the light emitting laminate S, and may be electrically connected to a first electrical connection unit 1410d.

The amount, a shape, a pitch, a contact area with the first conductivity-type semiconductor layer 1410, and the like, of the conductive via V and the first electrical connection unit 1410d may be appropriately regulated in order to lower contact resistance. Multiple conductive vias V and first electrical connection units 1410d may be arranged on a surface of the light emitting laminate S, to example arranged in rows and columns on the surface, to improve current flow.

The number of vias V and amount of contact areas thereof may be adjusted such that the total area of the plurality of vias V in contact with the first conductivity-type semiconductor ranges from 1% to 5% of the planar area (the planar area of the light emitting laminate S) of the light emitting device region. A radius (half (½) of a diameter D1) of each via may range, for example, from 5 μm to 20 μm, and the number of vias V may be 1 to 50 per light emitting device region according to a width of the light emitting region. Although different according to a width of the light emitting device region, two or more vias may be provided. A distance between the vias V may range from 100 um to 500 um, and the vias V may have a matrix arrangement in rows and columns. Preferably, the distance between vias may range from 150 um to 450 um. If the distance between the vias is smaller than 100 um, the number of vias V is increased such that a light emitting area is reduced and luminous efficiency is lowered. If the distance between the vias is greater than 500 um, current spreading suffers such that luminous efficiency may be degraded. A depth of the conductive via V may range from 0.5 μm to 5.0 μm. The depth of the conductive via V may vary according to a thickness of the first conductivity-type semiconductor layer 1420 and the active layer 1430.

Another electrode structure may include the second electrode 1420c directly formed on the second conductivity-type semiconductor layer 1420 and a second electrical connection portion 1420d formed on the second electrode 1420c. The second electrode 1420c forms an electrical-ohmic connection with the second conductivity-type semiconductor layer 1420. In addition, the second electrode 1420c may be made of a light reflective material whereby, as illustrated in FIG. 16, in a state in which the LED 741-4 is mounted as a so-called flip chip structure, light emitted from the active layer 1430 can be reflected on the second electrode 1420c so as to effectively be emitted toward the substrate 1401. Alternatively, the second electrode 1420c may be made of a light-transmissive conductive material such as a transparent conductive oxide, according to a main light emitting direction.

The second electrode 1420c is formed of a material selected on the basis of the second conductivity-type semiconductor layer 1420. For example, the second electrode 1420c can be an ohmic-electrode formed of a laminated Ag layer. The Ag ohmic-electrode also serves as a light reflective layer. A single layer of nickel (Ni), titanium (Ti), platinum (Pt), or tungsten (W) or an alloy layer thereof may be alternately laminated on the Ag layer. In detail, Ni/Ti layers, TiW/Pt layers, or Ti/W layers may be laminated or these layers may be alternately laminated on the Ag layer.

As for the first electrode 1410c, the material and structure of the first electrode 1410c may be selected on the basis of the first conductivity-type semiconductor layer 1410. In one example, a chromium (Cr) layer may be laminated, and Au/Pt layers may be sequentially laminated on the Cr layer, as the first electrode 1410c. In another example, an Al layer may be laminated and Ti/Ni/Au layers may be sequentially laminated on the Al layer, as the first electrode 1410c.

In order to enhance ohmic characteristics or reflecting characteristics, the first and second electrodes 1410c and 1420c may employ various materials or lamination structures other than those of the foregoing embodiments.

The two electrode structures as described above may be electrically separated and insulated from each other by the insulating layer 1450. The insulating layer 1450 may be made of any material as long as it has electrically insulating properties. Preferably, a material having a low degree of light absorption is used. For example, a silicon oxide or a silicon nitride such as $SiO_2$, $SiO_xN_y$, $Si_xN_y$, or the like, may be used. If necessary, a light reflective filler may be dispersed in the light-transmissive material of the insulating layer 1450 to form a light reflective structure.

The first and second electrode pads 1410e and 1420e may respectively be connected to the first and second electrical connection units 1410d and 1420d to serve as external terminals of the LED 741-4. An insulating material layer 1451 may be disposed in partial regions between the first and second electrical connection units 1410d and 1420d and the first and second electrode pads 1410e and 1420e.

The first and second electrode pads 1410e and 1420e may be made of gold (Au), silver (Ag), aluminum (Al), titanium (Ti), tungsten (W), copper (Cu), tin (Sn), nickel (Ni), platinum (Pt), chromium (Cr), NiSn, TiW, AuSn, or a eutectic metal thereof. In this case, when the LED is mounted on a package body 2100, the first and second electrode pads 1410e and 1420e may be bonded by using the eutectic metal, so solder bumps generally required for flip chip bonding may not be used. The use of a eutectic metal advantageously provides superior heat dissipation effects in the mounting method in comparison to the use of solder bumps. In this case, in order to obtain excellent heat dissipation effects, the first and second electrode pads 1410e and 1420e may be formed to occupy a relatively large area.

Also, a buffer layer may be formed between the light emitting structure S and the substrate 1401. The buffer layer may be an undoped semiconductor layer made of a nitride, or the like, and employed to alleviate lattice defects in the light emitting structure grown thereon.

In the present embodiment, the substrate 1401 may have first and second main surfaces opposing one another, and an uneven structure (e.g., a depression and protrusion pattern) may be formed on at least one of the first and second main surfaces. The uneven structure formed on one surface of the substrate 1401 may be formed by etching a portion of the substrate 1401, such that the uneven structure is made of the same material as the substrate 1401. Alternatively, the uneven structure may be made of a heterogeneous material different from that of the substrate 1401.

In the embodiment shown in FIG. 16, since the uneven structure is formed on the surface of the substrate 1401 that interfaces with the first conductivity-type semiconductor layer 1410, light emitted from the active layer 1430 can be diverted along a diversity of paths through the first conductivity-type semiconductor layer 1410, the uneven structure, and the substrate 1401. As a result, a light absorption ratio of light absorbed within the semiconductor layer can be reduced and a light scattering ratio can be increased, thereby increasing light extraction efficiency of the LED 741-4.

In detail, the uneven structure may be formed to have a regular or irregular shape. The heterogeneous material used to form the uneven structure may be a transparent conductor, a transparent insulator, or a material having excellent reflectivity. Here, as the transparent insulator, a material such as $SiO_2$, $SiN_x$, $Al_2O_3$, $HfO$, $TiO_2$, or $ZrO$ may be used. As the transparent conductor, a transparent conductive oxide (TCO) such as ZnO, an indium oxide containing an additive (e.g., Mg, Ag, Zn, Sc, Hf, Zr, Te, Se, Ta, W, Nb, Cu, Si, Ni, Co, Mo, Cr, Sn), or the like, may be used. As the reflective material, silver (Ag), aluminum (Al), or a distributed Bragg reflector (DBR) including multiple layers having different refractive indices, may be used. Materials other than those listed here can also advantageously be used.

In some examples, the substrate 1401 may be removed from the first conductivity-type semiconductor layer 1410. To remove the substrate 1401, a laser lift-off (LLO) process using a laser, an etching or a polishing process may be used. Also, after the substrate 1401 is removed, depressions and protrusions may be formed on the surface of the first conductivity-type semiconductor layer 1410.

As illustrated in FIG. 16, the LED 741-4 is mounted on the package body 2100. The package body 2100 may be a semiconductor substrate such as a silicon (Si) substrate, an insulating substrate, or a conductive substrate. Surface electrodes 2210a and 2220a and rear electrodes 2210b and 2220b are formed on upper and lower surfaces of the package body 2100, and conductive vias C1 and C2 are formed to penetrate through the package body 2100 to respectively connect the surface electrodes 2210a and 2220a to the rear electrodes 2210b and 2220b.

In the embodiment shown in FIG. 16, the LED 741-4 can uniformly spread a current and obtain excellent heat dissipation effects in a chip unit since a contact area between the LED and the package body is increased.

<Fifth Embodiment of LED 741>

Figure 17:
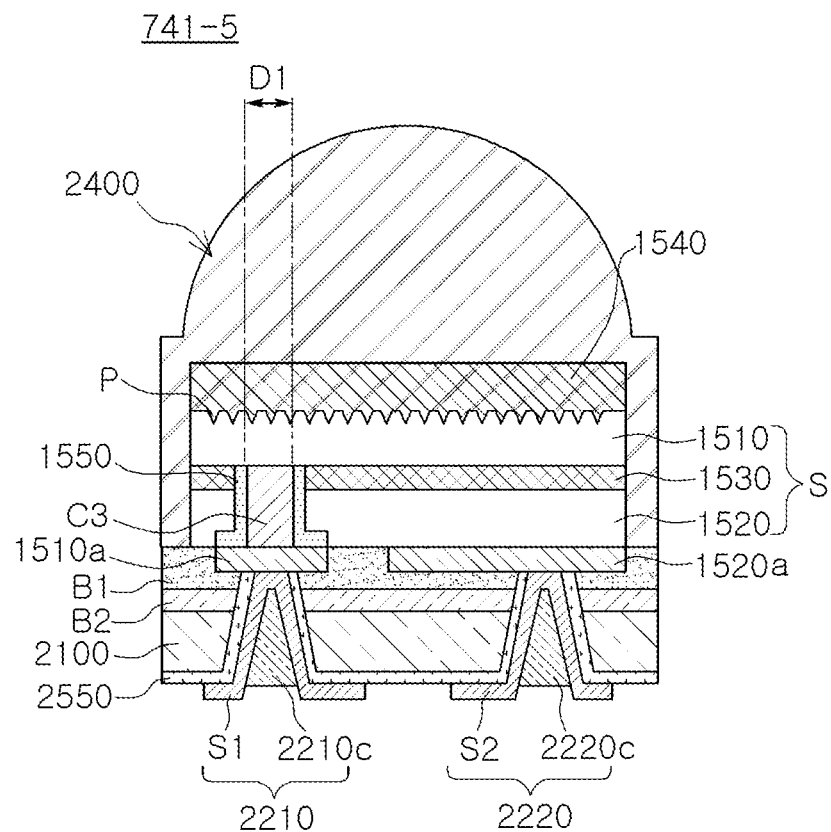

FIG. 17 illustrates an LED 741-5, e.g., an LED implemented as a so-called chip scale package (CSP), according to another embodiment of the present inventive concepts.

In detail, referring to FIG. 17, the LED 741-5 may include a light emitting laminate S. A wavelength conversion layer 1540 may be formed on the light emitting laminate S. The LED 741-5 package according to the present embodiment includes a package body 2100 including first and second electrode structures 2210 and 2220, and the LED 741-5 and a lens 2400 disposed on the package body 2100.

The package body 2100 may be a silicon (Si) substrate, a conductive support substrate, or an insulating support substrate having two or more conductive vias formed therethrough. The conductive vias are connected to the first electrode 1510a and the second electrode 1520a of the light emitting laminate S.

The light emitting laminate S has a lamination structure including the first and second conductivity-type semiconductor layers 1510 and 1520 and the active layer 1530 disposed therebetween. In the present embodiment, the first and second conductivity-type semiconductor layers 1510 and 1520 may be p-type and n-type semiconductor layers, respectively, and may be made of a nitride semiconductor, e.g., $Al_xIn_yGa_{(1-x-y)}N$ ($0 \leq x \leq 1$, $0 \leq y \leq 1$, $0 \leq x+y \leq 1$). However, besides a nitride semiconductor, a GaAs-based semiconductor or GaP-based semiconductor may also be used.

The active layer 1530 formed between the first and second conductivity-type semiconductor layers 1510 and 1520 may emit light having a predetermined level of energy according to electron-hole recombination, and may have a multi-quantum well (MQW) structure in which a quantum well layer and a quantum barrier layer are alternately laminated. In the case of the MQW structure, for example, an InGaN/GaN or AlGaN/GaN structure may be used.

Meanwhile, the first and second conductivity-type semiconductor layers 1510 and 1520 and the active layer 1530 may be formed by using a semiconductor growth process such as metal-organic chemical vapor deposition (MOCVD), molecular beam epitaxy (MBE), hydride vapor phase epitaxy (HVPE), or the like.

The LED 741-5 illustrated in FIG. 17 has had a growth substrate removed therefrom. A depression and protrusion pattern P may optionally be formed on the surface of the first conductivity-type semiconductor layer 1510 from which the growth substrate was removed.

A wavelength conversion film 1540 having phosphors may be formed on the depression and protrusion pattern P.

The LED 741-5 includes the first and second electrodes 1510a and 1520a connected to the first and second conductivity-type semiconductor layers 1510 and 1520, respectively. The first electrode 1510a includes a conductive via C3 connected to the first conductivity-type semiconductor layer 1510 and extending through the second conductivity-type semiconductor layer 1520 and the active layer 1530. An insulating layer 1550 is formed between the conductive via C3 and the active layer 1530 and the second conductivity-type semiconductor layer 1520 to prevent a short circuit.

A single conductive via C3 is illustrated, but two or more conductive vias C3 may be provided and arranged in various patterns of rows and columns on the surface of the light emitting laminate S to promote current spreading. In embodiments in which a plurality of vias C3 forming rows and columns is used, the number of vias and an amount of contact area between vias and the first conductivity-type semiconductor layer 1510 may be adjusted such that an area taken by the vias on the surface of the first conductivity-type semiconductor layer 1510 in contact with the vias ranges from 1% to 5% of the planar area of the light emitting device region (e.g., the planar area of the light emitting laminate S). For example, a radius (e.g., half of the diameter D1) of the via may range from 5 μm to 50 μm and the number of the vias C3 may range from 1 to 50 per light emitting device region according to the width of the light emitting device region. Preferably, two or more vias C3 may be provided, although the number of vias may vary depending on the width of the light emitting device region. The vias C3 may be disposed according to a matrix structure with rows and columns, in which a distance between adjacent vias (and a distance between adjacent rows or adjacent columns) ranges from 100 um to 500 um. More preferably, the distance between the vias may range from 150 um to 450 um. If the distance between the conductive vias C3 is smaller than 100 um, the number of vias C3 may be increased; however, a light emitting area of the LED may be reduced, and the luminous efficiency lowered. If the distance between adjacent vias is greater than 500 um, current spreading may suffer, thereby degrading luminous efficiency. A depth of the conductive via C3 may range from 0.5 μm to 5.0 μm, although the depth of the conductive via C3 may vary according to thicknesses of the second conductivity-type semiconductor layer 1520 and the active layer 1530.

Similarly to the embodiment of FIG. 16, the composition and structure of the second electrode 1520a may be selected on the basis of the second conductivity-type semiconductor layer 1520. In one example, the second electrode 1520a is an ohmic-electrode formed of an Ag layer that is laminated. The Ag ohmic-electrode also serves as a light reflective layer. A single layer of nickel (Ni), titanium (Ti), platinum (Pt), or tungsten (W) or an alloy layer thereof may be alternately laminated on the Ag layer. In detail, Ni/Ti layers, TiW/Pt layers, or Ti/W layers may be laminated or these layers may be alternately laminated on the Ag layer.

As for the first electrode 1510a, the composition and structure of the first electrode 1510a may be selected on the basis of the first conductivity-type semiconductor layer 1510. For example, a chromium (Cr) layer may be laminated, and Au/Pt layers may be sequentially laminated on the Cr layer, as the first electrode 1510a. In another example, an Al layer may be laminated and Ti/Ni/Au layers may be sequentially laminated on the Al layer.

In order to enhance ohmic characteristics or reflecting characteristics, the first and second electrodes 1510a and 1520a may employ various materials or lamination structures other than those of the foregoing embodiments.

The package body 2100 employed in this example may include a resin as a basic material thereof, and may include nanofibers and light reflective powder dispersed in the resin. The package body 2100 and the LED 741-5 may be bonded to each other by bonding layers B1 and B2. The bonding layers B1 and B2 may be made of an electrically insulating material. For example, the electrically insulating material may include a resin material such as an oxide or silicone resin such as $SiO_2$, SiN, or the like, an epoxy resin, and the like. This process may be implemented by applying the first and second body layers B1 and B2 to respective bonding surfaces of the LED 741-5 and the package body 2100 and subsequently bonding them together.

Two or more contact holes are formed from a lower surface of the package body 2100 so as to each be connected to a respective one of the first and second electrodes 1510a and 1520a of the LED 741-5. An insulating layer 2550 may be formed on a lateral surface of each contact hole and on a lower surface of the package body 2100. In a case in which the package body 2100 is a silicon substrate, the insulating layer 2550 may be provided as a silicon oxide film through thermal oxidation. Each contact hole is filled with a conductive material, to form one of the first and second electrodes 2210 and 2220 respectively connected to the first and second electrodes 1510a and 1520a. The first and second electrode structures 2210 and 2220 may include seed layers S1 and S2 and plating charged units 2210c and 2220c formed through a plating process by using the seed layers S1 and S2.

The chip-scale package (CSP) as described above and as illustrated in FIG. 17 does not require an additional package. The CSP thus provides a package having a reduced size and a simplified manufacturing process appropriate for mass-production. Also, since an optical structure such as a lens can be integrally manufactured, the CSP can be appropriately employed in an illuminating apparatus according to the present embodiment.

Various embodiments of a plate, such as the plate 720 of FIG. 10, are described in detail FIGS. 18-23.

The plate 720 is provided in a region in which the light source unit 740 is mounted, and may include a circuit board having a wiring pattern used for implementing at least part of the light source driving device 100. Here, the circuit board may be made of a material having an excellent heat dissipation function and excellent light reflectivity. For example, the circuit board may include an FR4-type printed circuit board (PCB) and may be made of an organic resin material containing epoxy, triazine, silicone, polyimide, or the like, and any other organic resin materials. The circuit board may also be made of a ceramic material such as a silicon nitride, AlN, $Al_2O_3$, or the like, or a metal and a metal compound. An MOCVD or a flexible PCB (FPCB) that can be freely changed in form thereof may also be used.

<First Embodiment of Plate 720>

Figure 18:
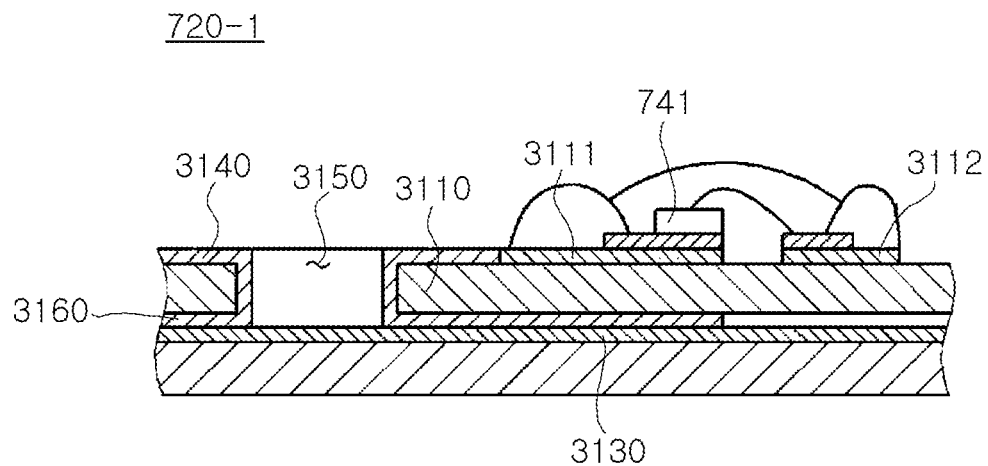
FIGS. 18 through 23 are views illustrating various examples of plates employable in the illuminating apparatus according to embodiments of the present inventive concepts.

As illustrated in FIG. 18, a plate 720-1 may include an insulating substrate 3110 including predetermined circuit patterns 3111 and 3112 formed on one surface thereof, an upper thermal diffusion plate 3140 formed on the insulating substrate 3110 such that the upper thermal diffusion plate 3140 is in contact with one or both of the circuit patterns 3111 and 3112, and a lower thermal diffusion plate 3160. The upper thermal diffusion plate 3140 dissipates heat generated by the LED 741. The upper thermal diffusion plate 3140 is disposed on one surface of the insulating substrate 3110, while the lower thermal diffusion plate 3160 is disposed on the other surface of the insulating substrate 3110. The lower thermal diffusion plate 3160 transmits heat from the upper thermal diffusion plate 3140 outwardly.

The upper thermal diffusion plate 3140 and the lower thermal diffusion plate 3160 may be connected via at least one through hole 3150 that penetrates through the insulating substrate 3110. The at least one through hole 3150 has plated inner walls so as to conduct heat between the upper and lower thermal diffusion plates 3140 and 3160.

In the insulating substrate 3110, the circuit patterns 3111 and 3112 may be formed by cladding a ceramic or epoxy resin-based FR4 core with copper and performing an etching process thereon. An insulating thin film 3130 may be formed by coating an insulating material on a lower surface of the substrate 3110 (e.g., on an outer surface of the lower thermal diffusion plate 3160).

<Second Embodiment of Plate 720>

Figure 19A:
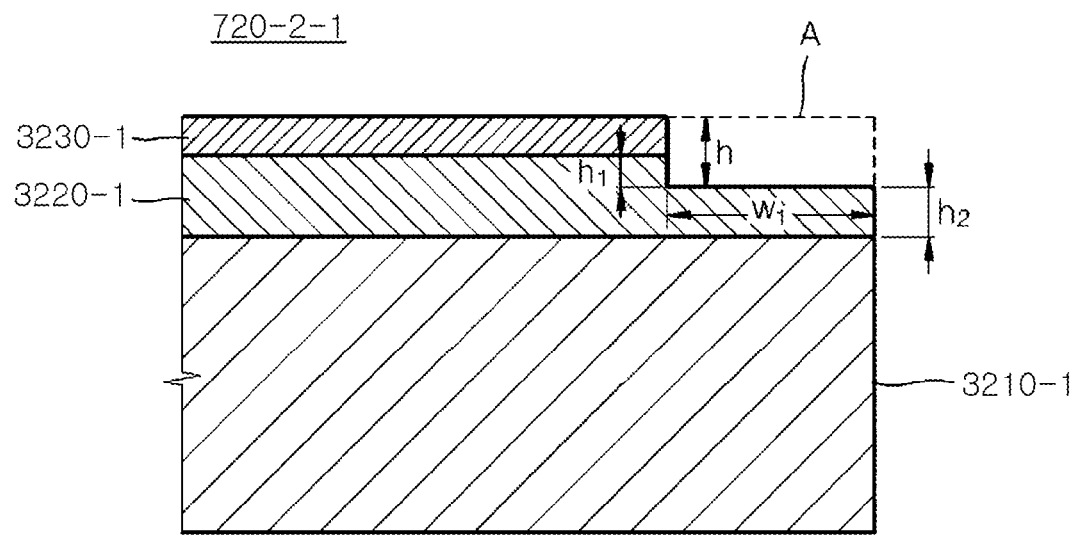

FIG. 19A illustrates another example of a plate, such as plate 720. As illustrated in FIG. 19A, a plate 720-2-includes a first metal layer 3210-1, an insulating layer 3220-1 formed on the first metal layer 3210-1, and a second metal layer 3230-1 formed on the insulating layer 3220-1. A step region 'A' allowing the insulating layer 3220-1 to be exposed may be formed in at least one end portion of the plate 720-2-1.

The first metal layer 3210-1 may be made of a material having excellent exothermic characteristics. For example, the first metal layer 3210-1 may be made of a metal such as aluminum (Al), iron (Fe), or the like, or an alloy thereof. The first metal layer 3210-1 may have a unilayer structure or a multi-layer structure. The insulating layer 3220-1 may basically be made of a material having insulating properties, and may be formed with an inorganic material or an organic material. For example, the insulating layer 3220-1 may be made of an epoxy-based insulating resin, and may include metal powder such as aluminum (Al) powder, or the like, in order to enhance thermal conductivity. The second metal layer 3230-1 may generally be formed of a copper (Cu) thin film.

As illustrated in FIG. 19A, in the plate 720-2-1 according to the present embodiment, a region located at one end of the insulating layer 3220-1 at an edge of the plate 720-2-1 may not have the second metal layer 3230-1 formed thereon, and may therefore be exposed. A length of the exposed region at one end portion of the insulating layer 3220-1, e.g., an insulation length, may be greater than a thickness of the insulating layer 3220-1. Here, the insulation length refers to a length of the exposed region of the insulating layer 3220-1 between the first metal layer 3210-1 and the second metal layer 3230-1. When viewed from above, a width of the exposed region of the insulating layer 3220-1 is an exposure width W1. The region 'A' of the second metal layer 3230-1 in FIG. 19A is removed through a grinding process, or the like, during the manufacturing process of the plate 720-2-1. The grinding process may form a depression having a depth 'h' downwardly from a surface of the second metal layer 3230-1 to expose the insulating layer 3220-1 by the exposure width W1, forming a step structure. If the end portion of the plate 720-2-1 is not removed, the insulation length may be equal to a thickness (h1+h2) of the insulating layer 3220-1. By removing a portion of the end portion of the plate 720-2-1, an insulation length equal to approximately W1 may be additionally secured. Thus, when a withstand voltage of the plate 720-2-1 is tested, the likelihood of contact between the two metal layers 3210-1 and 3230-1 in the end portions thereof is minimized because of the insulation length of approximately h1+h2+W1 between the two metal layers 3210-1 and 3230-1.

Figure 19B:
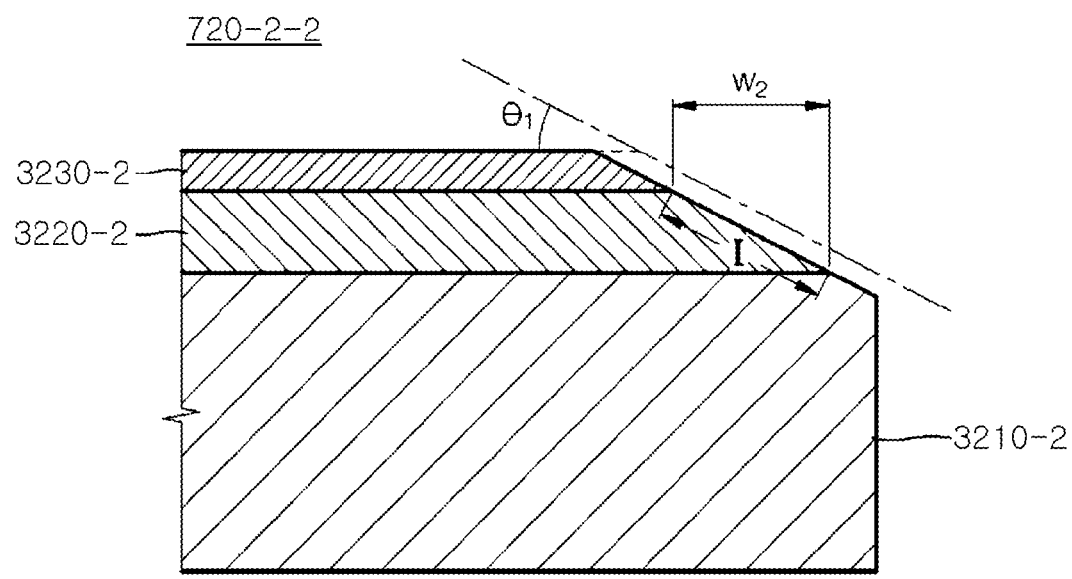

FIG. 19B is a view schematically illustrating a structure of a plate 720-2-2 according to a modification of FIG. 19A. Referring to FIG. 19B, the plate 720-2-2 includes a first metal layer 3210-2, an insulating layer 3220-2 formed on the first metal layer 3210-2, and a second metal layer 3230-2 formed on the insulating layer 3220-2. The insulating layer 3220-2 and the second metal layer 3230-2 include regions removed at a predetermined tilt angle θ1 measured with respect to an upper planar surface of the second metal layer 3230-2. The first metal layer 3210-2 may also include a region removed at the predetermined tilt angle θ1, as shown.

Here, the tilt angle θ1 may correspond to an angle between a planar surface interface between the insulating layer 3220-2 and the second metal layer 3230-2 and an end portion of the insulating layer 3220-2. The tilt angle θ1 may be selected to secure a desired insulation length I in consideration of a thickness of the insulating layer 3220-2. The tilt angle θ1 may be selected from within the range of 0<θ1<90 (degrees). As the tilt angle θ1 is increased, the insulation length I and a width W2 of the exposed region of the insulating layer 3220-2 is decreased, so in order to secure a larger insulation length, the tilt angle θ1 may be selected to be smaller. For example, the tilt angle may be selected from within the range of 0<θ1≤45 (degrees).

<Third Embodiment of Plate 720>

Figure 20:
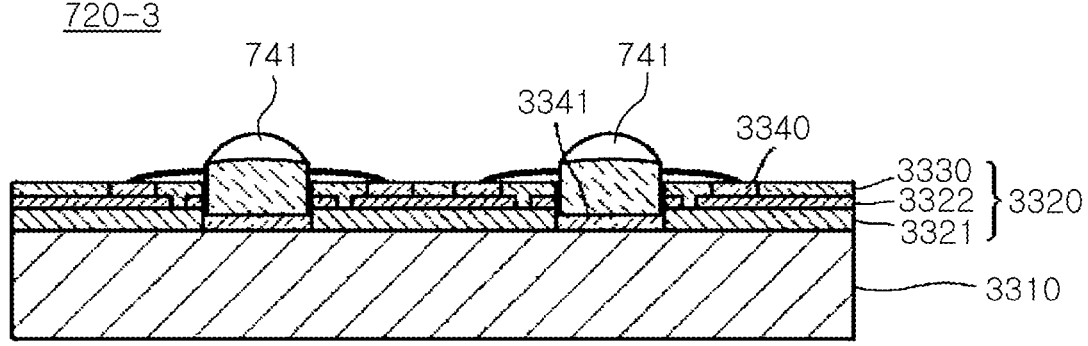

FIG. 20 schematically illustrates another example of a substrate that can be used as plate 720. Referring to FIG. 20, a plate 720-3 includes a metal support substrate 3310 and resin-coated copper (RCC) 3320 formed on the metal support substrate 3310. The RCC 3320 may include an insulating layer 3321 and a conductive pattern or a copper foil 3322 laminated on the insulating layer 3321. A portion of the RCC 3320 may be removed to form at least one recess in which the LED 741 may be installed. The plate 720-3 has a structure in which the RCC 3320 is removed from a lower region of the LED 741 or the LED package, and the LED 741 or the LED package is in direct contact with the metal support substrate 3310 (e.g., in direct contact through solder 3341). Thus, heat generated by the LED 741 or the LED package is directly transmitted to the metal support substrate 3310, thereby enhancing heat dissipation performance. The LED 741 or the LED package may be electrically connected or fixed through solders 3340 and 3341. A protective layer 3330 made of a liquid photo solder resist (PSR) may be formed on an upper portion of the copper foil 3322.

<Fourth Embodiment of Plate 720>

Figure 21A:
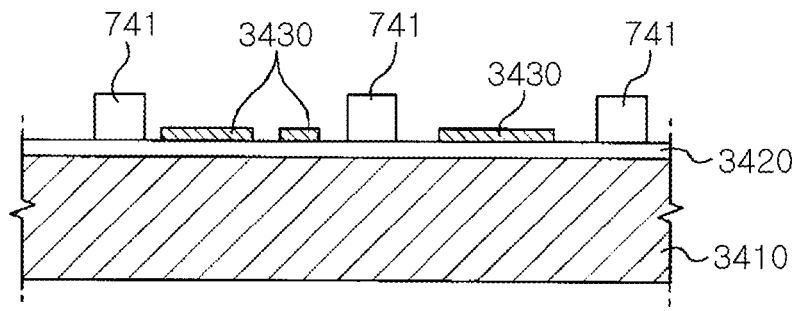
Figure 21B:
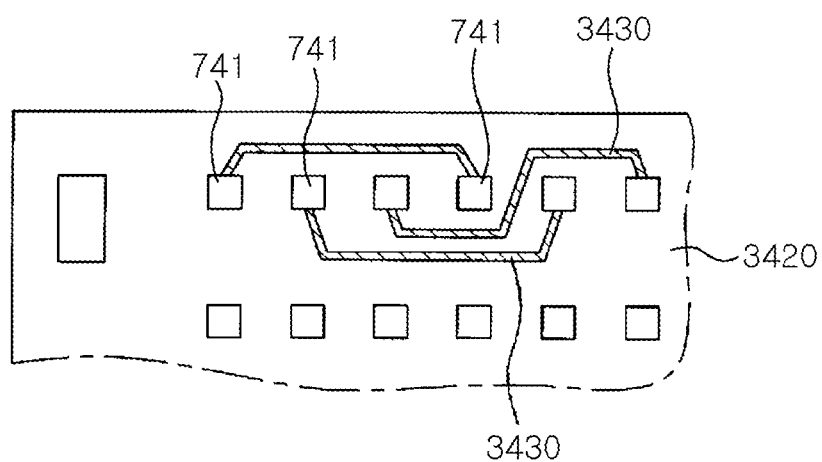

FIGS. 21A and 21B schematically illustrate another example of a plate such as plate 720 of FIG. 10. A plate 720-according to the present embodiment includes an anodized metal substrate having excellent heat dissipation characteristics and incurring low manufacturing costs. FIG. 21A is a cross-sectional view of the plate 720-4 and FIG. 21B is a top view of the plate 720-4.

Referring to FIGS. 21A and 21B, the plate (anodized metal substrate) 720-4 may include a metal board 3410, an anodic oxide film 3420 formed on the metal board 3410, and electrical wirings 3430 formed on the anodic oxide film 3420.

The metal board 3410 may be made of aluminum (Al) or an Al alloy that may be easily obtained at low cost. Besides, the metal board 3410 may be made of any other anodizable metal, for example, a material such as titanium (Ti), magnesium (Mg), or the like.

Aluminum oxide film ($Al_2O_3$) 3420 obtained by anodizing aluminum has a relatively high heat transmission characteristic ranging from about 10 W/mK to 30 W/mK. Thus, the plate (anodized metal substrate) 720-4 has superior heat dissipation characteristics as compared to those of a PCB, an MCPCB, or the like, of conventional polymer substrates.

<Fifth Embodiment of Plate 720>

Figure 22:
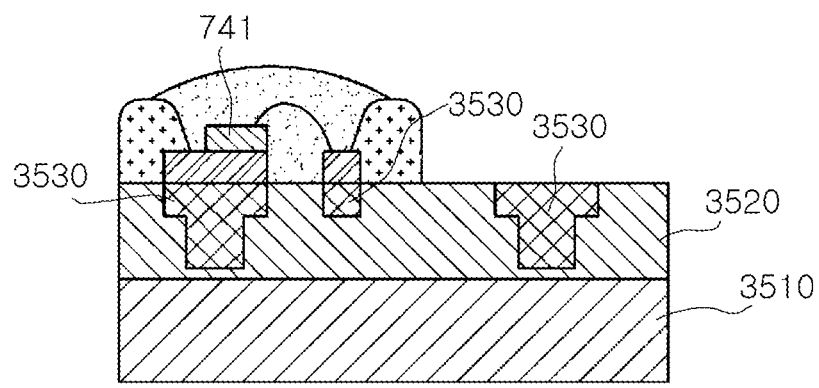

FIG. 22 schematically illustrates another example of a substrate that may be used as plate 720 of FIG. 10. As illustrated in FIG. 22, a plate 720-5 may include a metal substrate 3510, an insulating resin 3520 coated on the metal substrate 3510, and a circuit pattern 3530 formed on or within the insulating resin 3520. Here, the insulating resin 3520 may have a thickness equal to or less than 200 μm. The insulating resin 3520 may be laminated on the metal substrate 3510 in the form of a solid film or may be coated in the liquid form using spin coating or a blade. Also, the circuit pattern 3530 may be formed by filling a metal such as copper (Cu), or the like, in a circuit pattern intaglioed on the insulting layer 3520. The LED 741 may be mounted to be electrically connected to the circuit pattern 3530.

<Sixth Embodiment of Plate 720>

Figure 23:
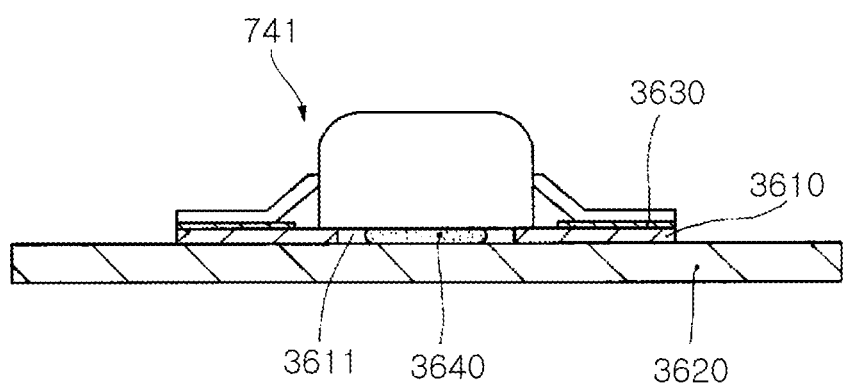

Meanwhile, the plate 720-6 may include a flexible PCB (FPCB) that can be freely deformed. In detail, as illustrated in FIG. 23, the plate 720-6 includes a flexible circuit board 3610 having one or more through holes 3611, and a support substrate 3620 on which the flexible circuit board 3610 is mounted. A heat dissipation adhesive 3640 may be provided in the through hole 3611 to couple a lower surface of the LED 741 and an upper surface of the support substrate 3620 to one another. Here, the lower surface of the LED 741 may be a lower surface of a chip package, a lower surface of a lead frame having an upper surface on which a chip is mounted, or a metal block. A circuit wiring 3630 is formed on the flexible circuit board 3610 and electrically connected to the LED 741.

In this manner, since the flexible circuit board 3610 is used, thickness and weight can be reduced, obtaining reduced thickness and weight and reducing manufacturing costs. Additionally, since the LED 741 is directly bonded to the support substrate 3620 by the heat dissipation adhesive 3640, heat dissipation efficiency in dissipating heat generated by the LED 741 can be increased.

Hereinafter, other aspects of the light source driving device 100 are described with reference back to FIG. 10.

The light source driving device 100 includes the transformer unit 110 including the coil Co1 of the primary winding part and the coil Co2 of the secondary winding part electromagnetically coupled to coil Co1 of the primary winding part and transforming the applied external power, the rectifying diode 120 rectifying output power from the coil Co2 of the secondary winding part of the transformer unit 110, the filter unit 140 having the input terminal and the output terminal outputting light source driving power, delivering rectified power, received from the input terminal from the rectifying diode 120 when the rectifying diode 120 is turned on, to the output terminal, and storing a partial amount of the rectified power, and an open loop preventing unit 130 providing a closed loop to the filter unit 140 such that the power stored in the filter unit 140 may be applied to the output terminal when the rectifying diode 120 is turned off.

Here, the coil Co1 of the primary winding part includes external input terminals 111a and 111b receiving external power from the socket 710. The coil Co1 of the primary winding part may have impedance selected to allow the ballast stabilizer 20 to output a normal amount of power. Namely, the present embodiment may be understood as an illuminating apparatus 700 including the light source driving device 100 of FIG. 1.

According to the present embodiment, an illuminating apparatus using a light source driving device that is directly compatible with a ballast stabilizer can be obtained.

Meanwhile, light finally or eventually generated by the illuminating apparatus 700 may be white light similar to that of an existing fluorescent lamp. However, the present inventive concepts are not limited thereto, and the illuminating apparatus 700 may emit visible light, infrared light, or ultraviolet light, besides white light.

<First Embodiment of White Light Implementation: Combination of Phosphors>

In order for the illuminating apparatus 700 to emit white light, for example, the illuminating apparatus 700 may be implemented such that a light source unit according to the present embodiment includes a blue LED and a wavelength conversion unit having wavelength conversion materials emitting wavelength-converted light upon being directly or indirectly excited by output light from the blue LED. Here, white light may be a mixture color of light from the blue LED and light from the wavelength conversion unit. For example, white light may be implemented by combining a yellow phosphor to the blue LED, or by combining at least one of yellow, red, and green phosphors to the blue LED. Also, the wavelength conversion unit may be provided in units of LED chips. For example, the wavelength conversion layer 1540 illustrated in FIG. 17 may be a wavelength conversion unit as mentioned herein.

Meanwhile, phosphors used in the illuminating apparatus 700 may have the following empirical formulas and colors.

In case of oxide-based phosphors, yellow and green phosphors may include a composition of (Y, Lu, Se, La, Gd, Sm)$_3$(Ga, Al)$_5$O$_{12}$:Ce. A blue phosphor may include a composition of BaMgAl$_{10}$O$_{17}$:Eu, 3Sr$_3$(PO$_4$)$_2$.CaCl:Eu.

In case of silicate-based phosphors, yellow and green phosphors may include a composition of (Ba, Sr)$_2$SiO$_4$:Eu, and yellow and orange phosphors may include a composition of (Ba, Sr)$_3$SiO$_5$:Eu.

In case of nitride-based phosphors, a yellow phosphor may include a composition of β-SiAlON:Eu, a yellow phosphor may include a composition of (La, Gd, Lu, Y, Sc)$_3$Si$_6$N$_{11}$:Ce, and an orange phosphor may include a composition of α-SiAlON:Eu. A red phosphor may include at least one of compositions of (Sr, Ca)AlSiN$_3$:Eu, (Sr, Ca)AlSi(ON)$_3$:Eu, (Sr, Ca)$_2$Si$_5$N$_8$:Eu, (Sr, Ca)$_2$Si$_5$(ON)$_8$:Eu, and (Sr, Ba)SiAl$_4$N$_7$:Eu.

In case of sulfide-based phosphors, a red phosphor may include a composition of at least one of (Sr, Ca)S:Eu and (Y, Gd)$_2$O$_2$S:Eu, and a green phosphor may include a composition of SrGa$_2$S$_4$:Eu.

Table 1 below shows types of phosphors in applications fields of white light emitting devices using a blue LED (440 nm to 460 nm).

TABLE 1

| Purpose | Phosphors |
| --- | --- |
| LED TV BLU | β-SiAlON:Eu$^{2+}$ |
|  | (Ca,Sr)AlSiN$_3$:Eu$^{2+}$ |
|  | L$_3$Si$_6$O$_{11}$:Ce$^{3+}$ |
| Lighting | Lu$_3$Al$_5$O$_{12}$:Ce$^{3+}$ |
|  | Ca-α-SiAlON:Eu$^{2+}$ |
|  | L$_3$Si$_6$N$_{11}$:Ce$^{3+}$ |
|  | (Ca,Sr)AlSiN$_3$:Eu$^{2+}$ |
|  | Y$_3$Al$_5$O$_{12}$:Ce$^{3+}$ |
| Side View | Lu$_3$Al$_5$O$_{12}$:Ce$^{3+}$ |
| (Mobile, Note PC) | Ca-α-SiAlON:Eu$^{2+}$ |
|  | L$_3$Si$_6$N$_{11}$:Ce3+ |
|  | (Ca,Sr)AlSiN$_3$:Eu$^{2+}$ |
|  | Y$_3$Al$_5$O$_{12}$:Ce$^{3+}$ |
|  | (Sr,Ba,Ca,Mg)$_2$SiO$_4$:Eu$^{2+}$ |
| Electrical component | Lu$_3$Al$_5$O$_{12}$:Ce$^{3+}$ |
| (Head Lamp, etc.) | Ca-α-SiAlON:Eu$^{2+}$ |
|  | L$_3$Si$_6$N$_{11}$:Ce$^{3+}$ |
|  | (Ca,Sr)AlSiN$_3$:Eu$^{2+}$ |
|  | Y$_3$Al$_5$O$_{12}$:Ce$^{3+}$ |

Phosphor compositions should basically conform with Stoichiometry, and respective elements may be substituted with different elements of respective groups of the periodic table. For example, strontium (Sr) may be substituted with barium (Ba), calcium (Ca), magnesium (Mg), or the like, of alkali earths, and yttrium (Y) may be substituted with terbium (Tb), Lutetium (Lu), scandium (Sc), gadolinium (Gd), or the like. Also, europium (Eu), an activator, may be substituted with cerium (Ce), terbium (Tb), praseodymium (Pr), erbium (Er), ytterbium (Yb), or the like, according to a desired energy level, and an activator may be applied alone or a co-activator, or the like, may be additionally applied to change characteristics.

Also, in implementing white light, the LED does not necessarily emit visible light. For example, the LED may generate UV light and at least one of blue, red, green, and yellow phosphors may be combined therewith to implement white light.

<Second Embodiment of White Implementation: LED Chip Combination>

Also, when an illuminating apparatus includes a plurality of LEDs, different LEDs among the plurality of LEDs may emit light having different wavelengths. For example, white light may be implemented by combining a red LED, a green LED, and a blue LED, for example.

Figure 24:
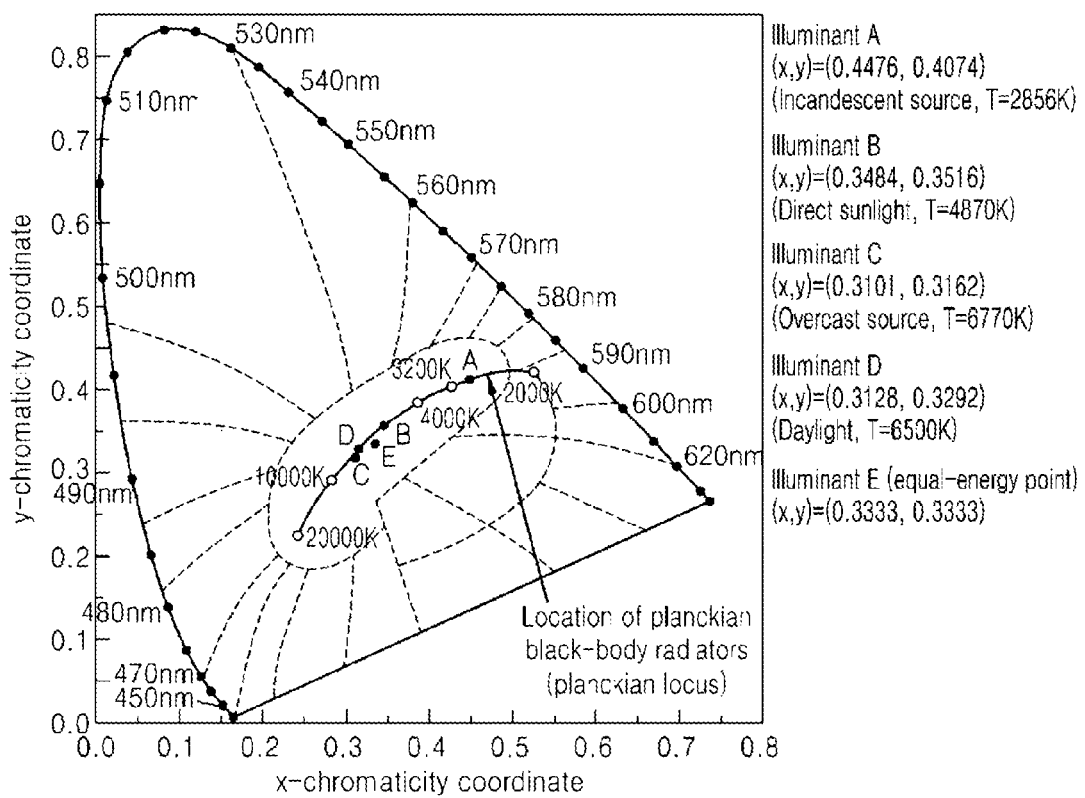
FIG. 24 is CIE 1931 color space coordinates chart illustrating a color temperature spectrum.

White light can be generated by applying yellow, green, red phosphors to a blue LED chip and combining at least one of green and red LED chips thereto may have two or more peak wavelengths and may be positioned in a segment linking (x,y) coordinates (0.4476, 0.4074), (0.3484, 0.3516), (0.3101, 0.3162), (0.3128, 0.3292), (0.3333, 0.3333) of a CIE 1931 chromaticity diagram such as the diagram shown in FIG. 24. Alternatively, white light may be positioned in a region surrounded by a spectrum of black body radiation and the segment. A color temperature of white light corresponds to a range from about 2000K to about 20000K. FIG. 24 illustrates the Planckian spectrum.

In this case, the light source device may control a color rendering index (CRI) adjusted to range from the CRI of a sodium-vapor lamp to the CRI of a sunlight level 100 by adjusting a mixture of phosphors and LEDs, and control a color temperature ranging from candlelight (1500K) to a blue sky (12000K) level to generate various white light.

If necessary, the light source device may generate visible light having purple, blue, green, red, orange colors, or infrared light to control an illumination color according to a surrounding atmosphere or mood. Also, the light source device may be applied to generate light having a special wavelength stimulating plant growth.

<Third Embodiment of White Light Implementation: Quantum Dot>

Also, materials such as quantum dots, or the like, may be applied as materials that replace phosphors, and phosphors and quantum dots may be used in combination or alone in an LED.

Figure 25:
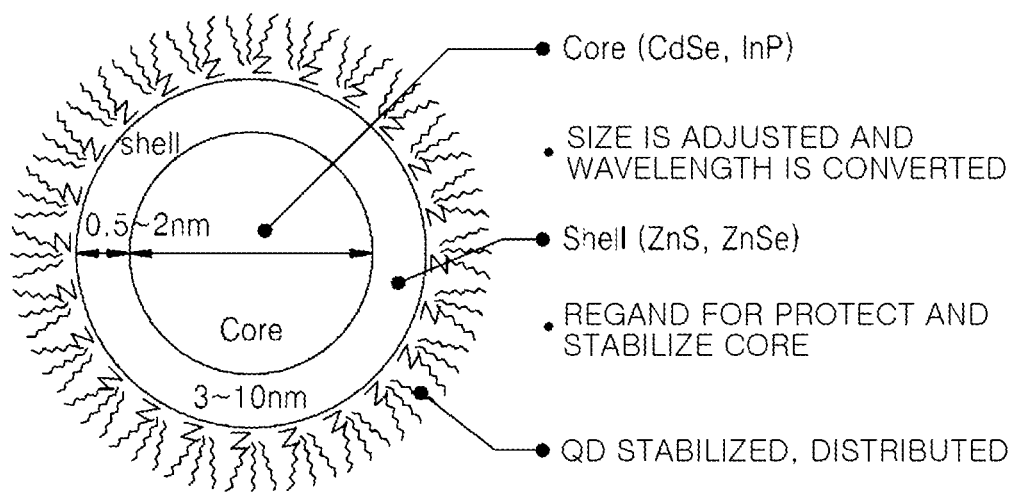
FIG. 25 is a diagram illustrating a structure of a quantum dot.

A quantum dot may have a structure including a core (3 to 10 nm) such as CdSe, InP, or the like, a shell (0.5 to 2 nm) such as ZnS, ZnSe, or the like, and a regand for stabilizing the core and the shell, and may implement various colors according to sizes. FIG. 25 is a view illustrating a structure of a quantum dot (QD) as described above.

Phosphors or quantum dots may be applied by using at least one of a method of spraying them on an LED chip or a light emitting module, a method of covering as a film, and a method of attaching as a sheet of ceramic phosphor, or the like.

As the spraying method, dispensing, spray coating, or the like, is generally used, and dispensing includes a pneumatic method and a mechanical method such as screw, linear type, or the like. Through a jetting method, an amount of dotting may be controlled through a very small amount of discharging and color coordinates may be controlled therethrough. In case of a method of collectively applying phosphors on a wafer level or in a light source unit in which an LED is mounted, productivity can be enhanced and a thickness can be easily controlled.

The method of directly covering a light emitting module or an LED chip with a film of phosphors or quantum dots may include electrophoresis, screen printing, or a phosphor molding method, and these method may have a difference according to whether a lateral surface of an LED is required to be coated or not.

Meanwhile, in order to control efficiency of a long wavelength light emitting phosphor re-absorbing light emitted in a short wavelength, among two types of phosphors having different light emitting wavelengths, two types of phosphor layers having different light emitting wavelengths may be provided, and in order to minimize re-absorption and interference of chips and two or more wavelengths, a distributed Bragg reflector (DBR) (e.g., an optical diffraction radiation (ODR)) layer may be included between respective layers.

The phosphors or quantum dots are provided to form a uniform coated film, for example after a phosphor is fabricated as a film or a ceramic form and attached to an LED.

In order to differentiate light efficiency and light distribution characteristics, a light conversion material may be positioned in a remote form (e.g., the light conversion material can be positioned to as to be spaced away from the light source), and in this case, the light conversion material may be positioned together with a material such as a light-transmissive polymer, glass, or the like, according to durability and heat resistance.

A phosphor applying technique plays a very important role in determining light characteristics in an illuminating apparatus, so techniques of controlling a thickness of a phosphor application layer, a uniform phosphor distribution, and the like, can advantageously be used. Quantum dots may also be positioned in an LED in the same manner as that of phosphors, and may be positioned in glass or light-transmissive polymer material to perform optical conversion.

Meanwhile, in order to protect an LED from an external environment or in order to improve light extraction efficiency of light emitted to the outside of an LED, a light-transmissive material may be positioned as a filter on the LED.

In this case, a transparent organic solvent such as epoxy, silicone, a hybrid of epoxy and silicone, or the like, is applied as a light-transmissive material, and the light-transmissive material may be cured according to heating, light irradiation, a time-lapse method, or the like.

In case of silicone, polydimethyl siloxane is classified as a methyl-based silicone and polymethylphenyl siloxane is classified as a phenyl-based silicone. The methyl-based silicone and the phenyl-based silicone have differences in refractive indexes, water vapor transmission rates, light transmittance amounts, light fastness qualities, and thermostability. Also, the methyl-based silicone and the phenyl-based silicone have differences in curing speeds according to a cross linker and a catalyst, affecting phosphor distribution.

Light extraction efficiency varies according to a refractive index of a filler, and in order to minimize a gap between a refractive index of the outermost medium from which blue light is emitted and a refractive index of the outside (air), two or more types of silicone having different refractive indices may be sequentially laminated.

In general, the methyl-based silicone has the highest level of thermostability, and variations in a temperature increase are reduced in order of phenyl-based silicone, hybrid silicone, and epoxy silicone. Silicone may be classified as a gel type silicone, an elastomer type silicone, and a resin type silicone according to the degree of hardness thereof.

Also, the LED may further include a lens for radially guiding light irradiated from a light source. In this case, a method of attaching a previously formed lens to the LED, a method of injecting an organic solvent having fluidity to the LED or to a mold and solidify the same, and the like, may be used.

The lens attachment method includes directly attaching a lens to a filler in an upper portion of the LED, bonding only an outer portion of the LED and only an outer portion of the lens, spaced apart from the filler, and the like. As the method of injecting into a mold, injection molding, transfer molding, compression molding, or the like, may be used.

Light transmission characteristics may be changed according to shapes of lenses (concave, convex, uneven, conical, and geometrical structures), and lenses may be deformed according to efficiency and light distribution characteristics.

Hereinafter, a lighting system implemented by applying an illuminating apparatus according to the present embodiment will be described with reference to FIGS. 26 through 33.

<First Application Example of Illuminating Apparatus 700 to Lighting System>

A lighting system according to the present embodiment illustrated in FIGS. 26 through 29 may automatically regulate a color temperature according to a surrounding environment (e.g., temperature and humidity) and provide sensitivity lighting meeting human sensitivity, rather than serving as simple lighting.

Figure 26:
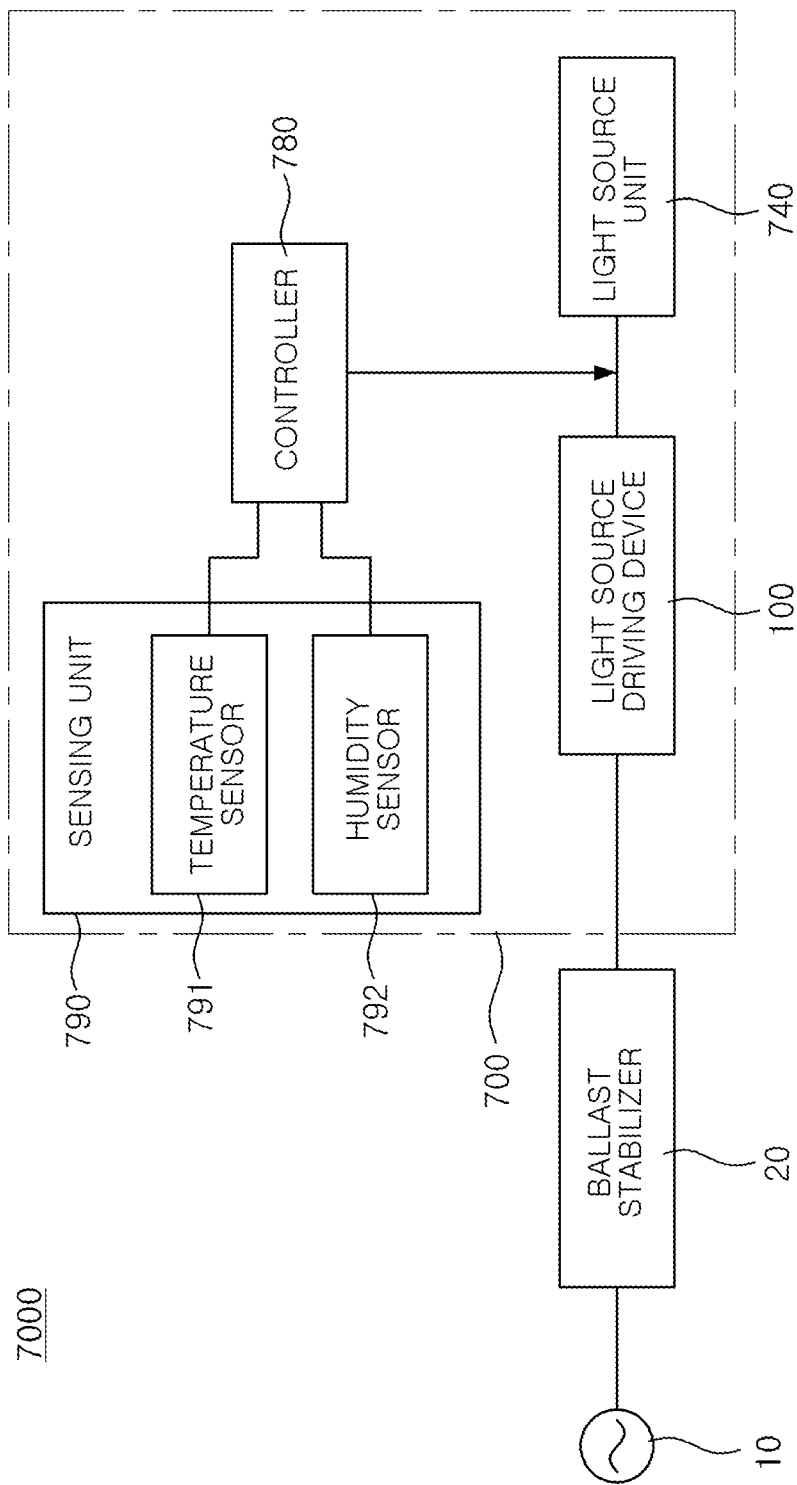
FIGS. 26 through 33 are diagrams illustrating a lighting system and a method of using the lighting system including an illuminating apparatus according to embodiments of the present inventive concepts.

FIG. 26 is a block diagram schematically illustrating a lighting system 7000 according to an embodiment of the present inventive concepts.

Referring to FIG. 26, the lighting system 7000 according to an embodiment of the present inventive concept includes an external power source 10, a ballast stabilizer 20 connected to the external power source 10, and an illuminating apparatus 700 driven upon receiving power applied from the ballast stabilizer 20.

The illuminating apparatus 700 includes a light source unit 740 and a light source driving device 100. Here, the light source driving device 100 may be connected to the ballast stabilizer 20 to receive power, and may apply light source driving power to the light source unit 740.

According to the present embodiment, the illuminating apparatus 700 may further include a sensing unit 790 and a controller 780. The sensing unit 790 may be installed in an indoor or outdoor area, and may have a temperature sensor 791 and a humidity sensor 792 to measure at least one air condition among an ambient temperature and humidity. The sensing unit 790 delivers the measured air condition, e.g., a temperature and/or humidity, to the controller 780 electrically connected thereto.

Upon receiving a signal from the sensing unit 790, the controller 780 may control an operation of the light source unit 740. For example, the controller 780 compares the measured air temperature and humidity with air conditions (temperature and humidity ranges) previously set by a user, and determines a color temperature of the light source unit 740 corresponding to the air condition. To this end, the controller 780 may be electrically connected to the light source driving device 100, so as to control power (e.g., an amount of current) applied from the light source driving device 100 to the light source unit 740 such that the light source unit 740 may be driven at the color temperature determined based on the air conditions.

Figure 27:
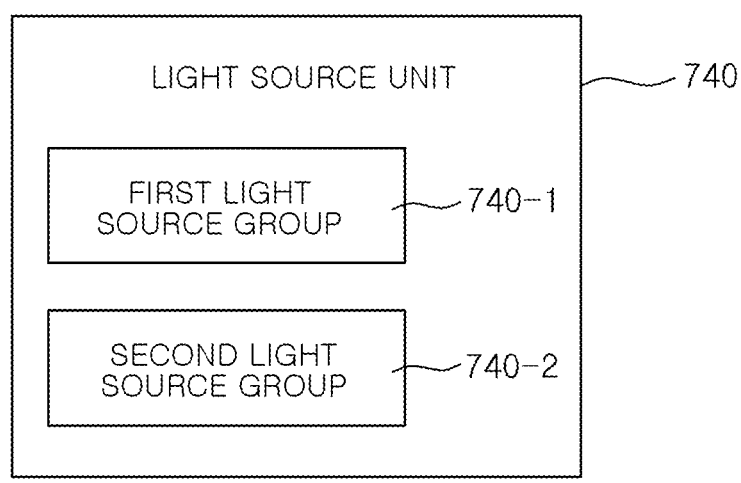

As described above, the light source unit 740 may operate using power supplied from the light source driving device 100. Here, as illustrated in FIG. 27, the light source unit 740 may include first and second light source groups 740-1 and 740-2 respectively including an aggregation of LEDs having different color temperatures. Here, the first and second light source groups 740-1 and 740-2 may be designed to emit the same white light as a whole.

For example, the first light source group 740-1 may emit white light having a first color temperature, and the second light source group 740-2 may emit white light having a second color temperature. The first color temperature may be lower than the second color temperature. In other examples, the first color temperature may be higher than the second color temperature.

Here, white color having a relatively low temperature corresponds to a warm white color, and white color having a relatively high color temperature corresponds to a cold white color. When power is supplied to the first and second light source groups 740-1 and 740-2, the first and second light source groups 740-1 and 740-2 emit white light having first and second color temperatures, respectively. The white light emitted by the respective light source groups may be mixed to implement white light having a color temperature determined by the controller 780.

In detail, in a case in which the first color temperature is lower than the second color temperature, if the color temperature determined by the controller 780 is relatively high, an amount of light from the first light source group 740-1 may be reduced and an amount of light from the second light source group 740-2 may be increased to implement mixed white light having the determined color temperature. Conversely, when the determined color temperature is relatively low, an amount of light from the first light source group 740-1 may be increased and an amount of light from the second light source group 740-2 may be reduced to implement white light having the determined color temperature. Here, the amount of light from each of the light source groups 740-1 and 740-2 may be controlled by differently regulating an amount of current applied from the light source driving device 100 to each light source group, or may be implemented by regulating the number of lighted LEDs in each light source group.

Figure 28:
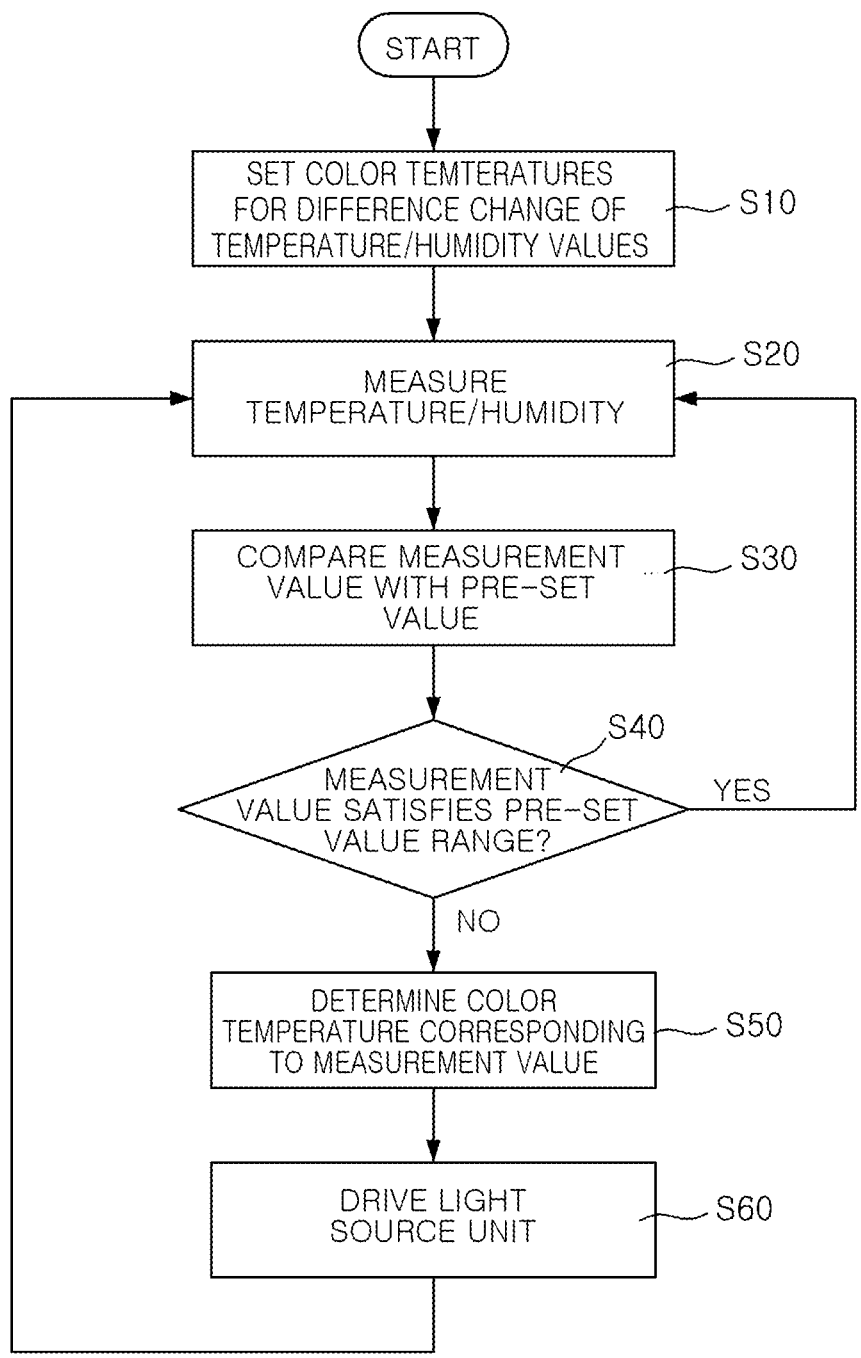

FIG. 28 is a flow chart illustrating a method for controlling the lighting system 7000 illustrated in FIG. 26. Referring to FIG. 28, first, the user sets a color temperature according to temperature and humidity ranges through the controller 780 (S10). The set temperature and humidity data are stored in the controller 780. In particular, a color temperature is associated with each of a plurality of ranges of temperature and/or humidity values, and the association between the color temperatures and ranges of temperature and/or humidity values are stored as pre-set values in memory.

In general, when a color temperature is equal to or more than 6000K, a color providing a cool feeling, such as blue, may be produced. When a color temperature is less than 4000K, a color providing a warm feeling, such as red, may be produced. Thus, in the present embodiment, when temperature and humidity exceed 20° C. and 60%, respectively, the user may set the light source unit 740 to be turned on to have a color temperature higher than 6000K through the controller 780; when a temperature and humidity range from 10° C. to 20° C. and 40% to 60%, respectively, the user may set the light source unit 740 to be turned on to have a color temperature ranging from 4000K to 6000K through the controller 780; and when a temperature and humidity are lower than 10° C. and 40%, respectively, the user may set the light source unit 740 to be turned on to have a color temperature lower than 4000K through the controller 780.

Next, the sensing unit 790 measures at least one condition among an ambient temperature and an ambient humidity (S20). The temperature and humidity measured by the sensing unit 790 are delivered to the controller 780.

Subsequently, the controller 780 compares the measurement values delivered from the sensing unit 790 with pre-set values, respectively (S30). Here, the measurement values are temperature and humidity data measured by the sensing unit 790, and the set values are temperature and humidity data which have been set by the user and stored in the controller 780 in advance. Namely, the controller 780 compares the measured temperature and humidity with the pre-set ranges of temperature and humidity values.

According to the comparison results, the controller 780 determines whether the measurement values satisfy any of the pre-set ranges (S40). When the measurement values satisfy the pre-set values, the controller 780 maintains a current color temperature, and measures again a temperature and humidity (S20). Meanwhile, when the measurement values do not satisfy the pre-set values, the controller 780 detects pre-set values corresponding to the measurement values, and determines a corresponding color temperature (S50). The controller 780 controls power applied from the light source driving device 100 to the light source unit 740 such that the light source unit 740 can be driven at the determined color temperature. To this end, the controller 780 may include known power controllers such as a switch, a resistor, a DC/DC converter, and the like, provided between the light source driving device 100 and the light source unit 740.

Then, the light source 740 may be driven to have the determined color temperature (S60). Accordingly, the light source 740 may have the color temperature adjusted to correspond to the temperature and humidity previously set by the user according to the ambient temperature and humidity.

In this manner, the lighting system 7000 is able to automatically regulate a color temperature of the indoor lighting according to changes in ambient temperature and humidity, thereby satisfying human moods varied according to changes in the surrounding natural environment and providing psychological stability.

Figure 29:
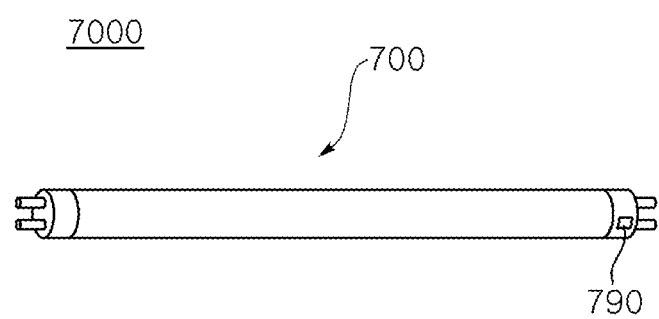

FIG. 29 schematically illustrates an implementation example of the lighting system 7000 illustrated in FIG. 26. As illustrated in FIG. 29, the illuminating apparatus 700 may be installed on the ceiling as an indoor lighting fitting. Here, the sensing unit 790 may be disposed in a position appropriate to measure ambient temperature and humidity.

In the present embodiment, the sensing unit 790 is designed to sense a temperature and humidity used to control a color temperature, but the present inventive concepts are not limited thereto. For example, the sensing unit 790 may include a motion sensor and an illumination sensor for sensing a user's motion and intensity of illumination. Here, the lighting system may be set to perform a control operation of turning off the light source unit if a user's motion is not sensed for a pre-set period of time. Also, the lighting system 7000 may compare a value sensed by the illumination sensor with a pre-set illumination value and perform a control operation to output a desired intensity of illumination.

Another example of the lighting system that can be controlled as described will be described in detail with reference to FIGS. 30 through 33.

<Second Application Example of Illuminating Apparatus to Lighting System>

Figure 30:
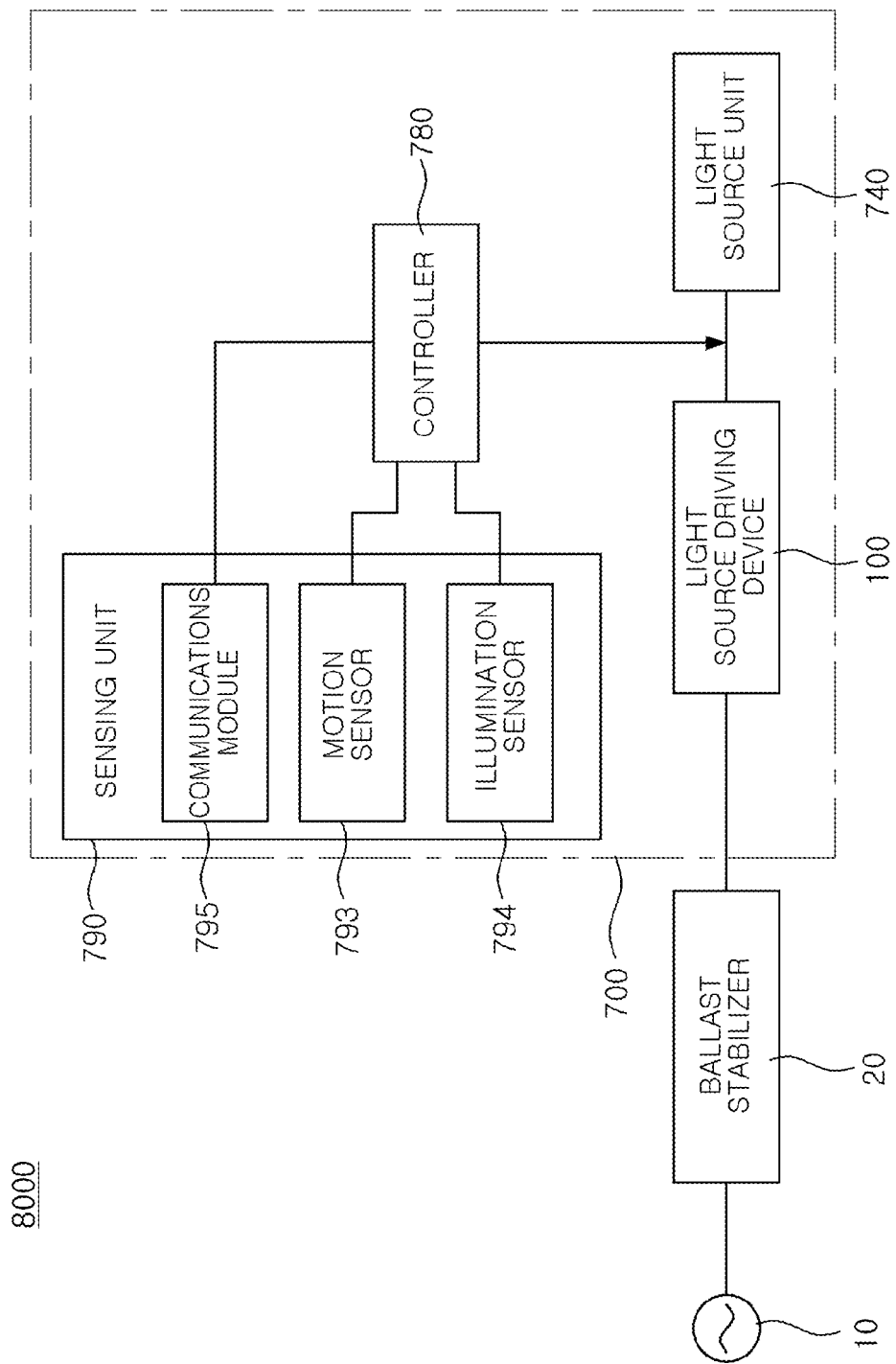
Figure 31:
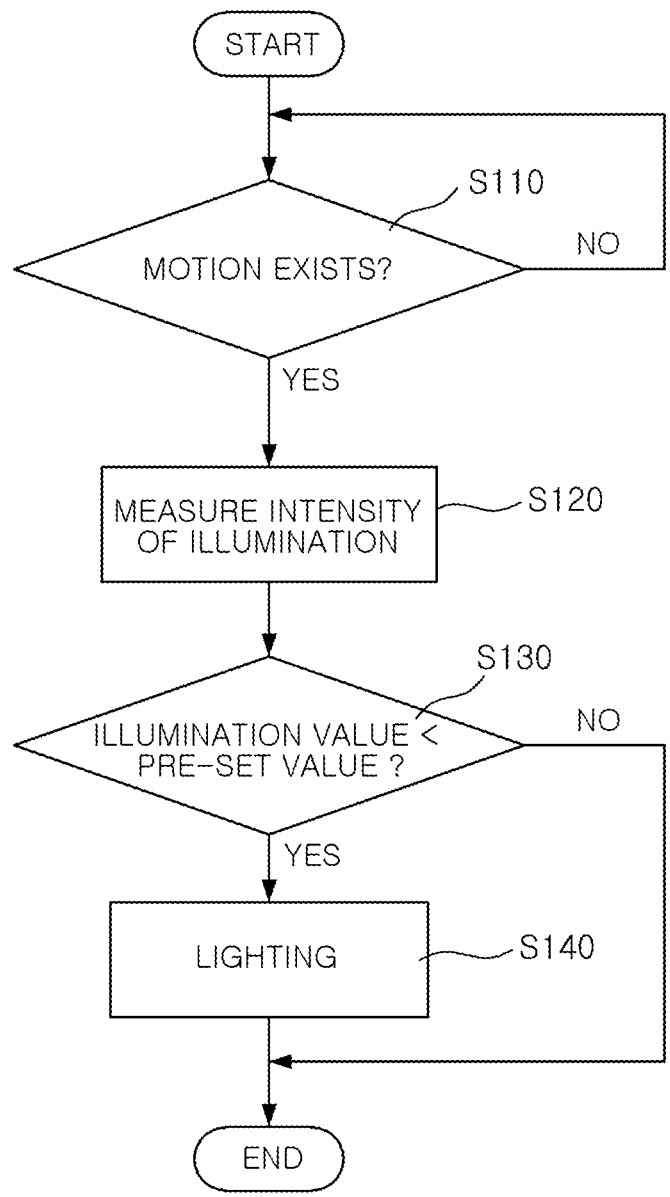

FIG. 30 is a block diagram schematically illustrating a lighting system 8000 according to an embodiment of the present inventive concepts, and FIG. 31 is a flow chart illustrating a method for controlling the lighting system 8000 illustrated in FIG. 30.

First, referring to FIG. 30, the lighting system 8000 includes the external power source 10, the ballast stabilizer 20 connected to the external power source 10, and the illuminating apparatus driven upon receiving power from the ballast stabilizer 20.

The illuminating apparatus 700 includes the light source unit 740 and the light source driving device 100. Here, the light source driving device 100 may be connected to the ballast stabilizer 20 and to the light source unit 740 such that it can apply light source driving power received from the ballast stabilizer 20 to the light source unit 740.

According to the present embodiment, the illuminating apparatus 700 may further include the sensing unit 790 and the controller 780. Here, the sensing unit 790 may include the motion sensor 793, the illumination sensor 794, and/or a communications module 795.

Hereinafter, a method for controlling the lighting system 8000 will be described with reference to FIG. 31.

First, the motion sensor 793 senses a user's motion or a movement of the illuminating apparatus and outputs an operation sensing signal (S110). The operation sensing signal may be a signal for activating overall power. Namely, when a motion of the user or the illuminating apparatus is sensed, the motion sensor 793 outputs an operation sensing signal to the controller 780.

Next, based on the operation signal, an intensity of illumination of a surrounding environment is measured and an illumination intensity measurement value is output (S120). When the operation sensing signal is applied to the controller 780, the controller 780 outputs a signal to the illumination sensor 794, and the illumination sensor 794 then measures an intensity of illumination of the surrounding environment. The illumination sensor 794 outputs the measured illumination intensity value of the surrounding environment to the controller 780. Thereafter, whether to turn on the illuminating apparatus is determined according to the illumination intensity value, and the illuminating apparatus emits light according to the determination.

First, the illumination intensity measurement value is compared with a pre-set value for a determination. When the illumination intensity measurement value is input to the controller 780, the controller 780 compares the received illumination intensity measurement value with a stored pre-set value and determines whether the former is lower than the latter. Here, the pre-set value is a value for determining whether to turn on the illuminating apparatus. For example, the pre-set value may be an illumination intensity value at which a user may have difficulty in recognizing an object with the naked eye or may make a mistake in a certain situation, for example, a situation in which the sun starts to set.

When the illumination intensity measurement value measured by the illumination sensor 794 is higher than the pre-set value, lighting is not required, so the controller 780 shuts down the overall light source unit 740.

Meanwhile, when the illumination intensity measurement value measured by the illumination sensor 794 is lower than the pre-set value, lighting is required, so the controller 780 outputs a signal to the light source unit 740 and the light source unit 740 emits light (S140).

Figure 32:
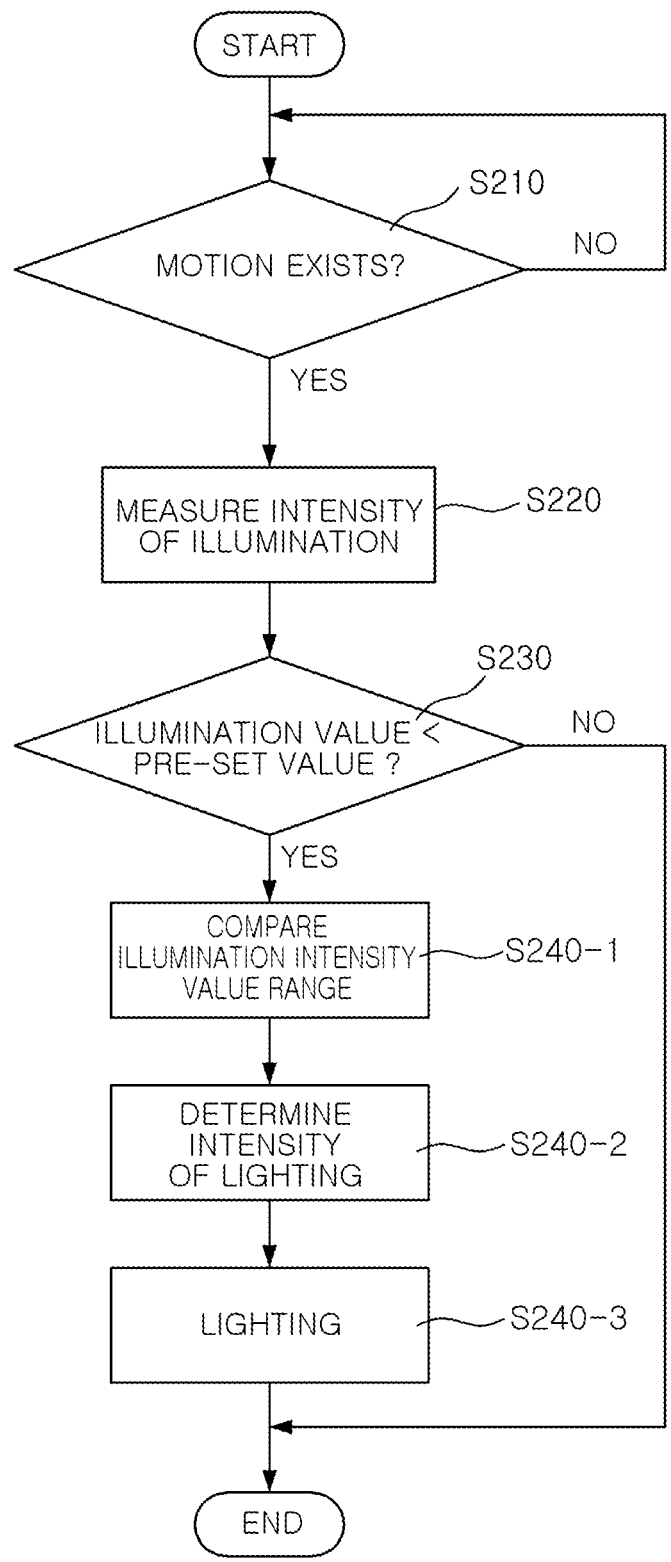

FIG. 32 is a flow chart illustrating a method for controlling the lighting system 8000 according to another embodiment of the present inventive concepts. Hereinafter, a method for controlling the lighting system 8000 according to another embodiment of the present inventive concepts will be described. However, description of steps that are substantially similar to corresponding steps of the method for controlling a lighting system as described above with reference to FIG. 31 will be omitted.

As illustrated in FIG. 32, in the case of the method for controlling the lighting system 8000 according to the present embodiment, an intensity of light emissions of the lighting may be regulated according to an illumination intensity value of a surrounding environment.

As described above, the illumination sensor 794 outputs a measured illumination intensity value to the controller 780 (S220). When the illumination intensity value is lower than a pre-set value (S230), the controller 780 determines a range of the measured illumination intensity value (S240-1). The controller 780 has a plurality of ranges of illumination intensity values, based on which the controller 780 determines the range among the plurality of the ranges that includes the measured illumination intensity value.

Next, when the range that includes the measured illumination intensity value is determined, the controller 780 determines an intensity of light emissions of the light source unit (S240-2), and accordingly, the controller 780 controls the light source unit 740 to emit light (S240-3) of the determined intensity. The intensity of light emissions may be selected according to the measured illumination intensity value, and here, the illumination intensity value varies according to weather, time, and surrounding environment, so the intensity of lighting may also be regulated. By regulating the intensity of light emissions according to different ranges of measured illumination intensity value, power wastage can be prevented and a user attention may be drawn to their surroundings.

Figure 33:
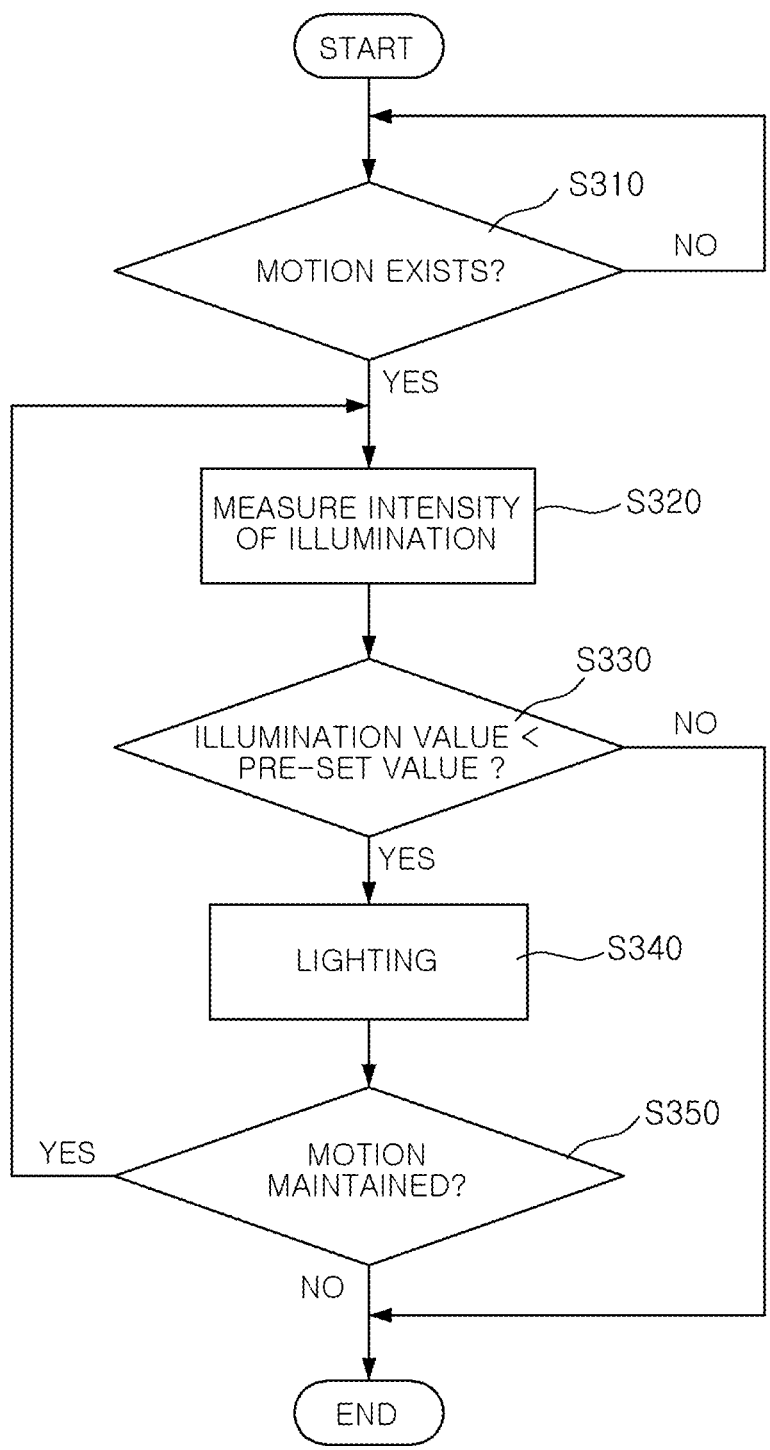

FIG. 33 is a flow chart illustrating a method for controlling the lighting system 8000 according to another embodiment of the present inventive concepts. Hereinafter, a method for controlling the lighting system 8000 according to another embodiment will be described. However, description of steps that are substantially similar to corresponding steps of the methods for controlling a lighting system as described above with reference to FIGS. 31 and 32 will be omitted.

The method for controlling the lighting system 8000 further includes operation 5350 of determining whether a motion of a user or the illuminating apparatus is maintained when the light source unit 740 emits light, and determining whether to maintain light emissions.

First, when the light source unit 740 starts to emit light, termination of the light emissions may be determined based on whether the user moves. Here, when a user's motion is not sensed for more than a pre-set period of time, it may be determined that the user is sleeping, is away, or the like, and thus, the lighting function is not necessary.

The determination of whether to maintain light emissions is performed according to whether a motion of the user or the illuminating apparatus is sensed by the motion sensor 793. When a user's motion is continuously sensed by the motion sensor 793, intensity of illumination is measured again so as to determine whether to maintain light emissions. Meanwhile, when a motion is not sensed, the system controls the light source to terminate light emission.

According to the lighting system according to the present embodiment, although the user does not perform an ON/OFF operation, whether to turn on the light source unit can be controlled automatically by exchanging interactive information with the user.

According to an embodiment, the communications module 795 may be modularized integrally with the sensing unit. Referring back to FIG. 30, the lighting system 8000 according to the present embodiment includes a communications module 795. The communications module 795 may receive a radio signal provided with respect to driving of the illuminating apparatus. Here, the controller 780 may control an operation of the light source unit 740 upon receiving a signal from the communications module 795.

The communications module 795 may be integrally modularized with the sensing unit 790, but the present inventive concept is not limited thereto and the communications module 795 may be implemented separately from the sensing unit 790.

The communications module 795 may be, for example, a ZigBee module. For household wireless communications, a signal from the illuminating apparatus 700 may be transmitted to household devices such as a garage door opening and closing device, a door lock, a home appliance, a cellular phone, a TV, a router, a general illumination switch, and the like, through a gateway hub, whereby the household devices can be controlled. Also, the illuminating apparatus 700 may be controlled by signals from the household devices. Thus, the household devices may also include a communications module for wireless communications such as ZigBee and/or Wi-Fi. According to an embodiment, communications may be performed directly with the household devices without the gateway hub.

Also, the illuminating apparatus 700 may detect a type of a channel or a program of the TV on the air (currently being aired or broadcast) or detect brightness of the screen of the TV, and brightness of the illuminating apparatus 700 may be automatically controlled accordingly. For example, when a TV show, or the like, is broadcast and a dim atmosphere is required, a color sense of illumination of the illuminating apparatus 700 is controlled such that a color temperature is lowered to below 12000K according to the atmosphere. Reversely, in case of a light atmosphere such as a light entertainment TV program, a color temperature of illumination of the illuminating apparatus 700 is also increased to above 12000K to provide white illumination based on blue color.

As set forth above, according to embodiments of the present inventive concepts, the light source driving device is directly compatible with a ballast stabilizer by having electrical characteristics similar to those of a fluorescent lamp.

Also, an illuminating apparatus having the foregoing light source driving device can be obtained.

Advantages and effects of the present inventive concepts are not limited to the foregoing content and any other technical effects not mentioned herein may be easily understood by a person skilled in the art from the foregoing description.

While the present inventive concepts have been shown and described in connection with particular embodiments, it will be apparent to those skilled in the art that modifications and variations can be made without departing from the spirit and scope of the inventive concepts as defined by the appended claims.

What is claimed is:

1. A circuit for driving a light emitting diode (LED) lamp including a plurality of LEDs based on alternating current (AC) power received from a ballast stabilizer configured to drive a lamp, the circuit comprising:
    an inductive load coupled to the ballast stabilizer and configured to receive the AC power at terminals thereof;
    a rectifying circuit, electrically coupled to the inductive load and configured to rectify the AC power to produce a unidirectional current; and
    an output circuit configured to receive the unidirectional current from the rectifying circuit, and to produce an output current for driving the LED lamp,
    wherein the inductive load comprises at least two input windings each coupled between two of at least three input terminals receiving the AC power.

2. The circuit of claim 1, wherein the inductive load is directly connected to the ballast stabilizer.

3. The circuit of claim 1, wherein the inductive load is a transformer configured to receive the AC power at terminals of an input winding, and to produce a transformed AC power at terminals of an output winding.

4. The circuit of claim 3, wherein the transformer is an isolation transformer.

5. The circuit of claim 3, wherein the rectifying circuit comprises a rectifying diode coupled to a terminal of the output winding of the inductive load.

6. The circuit of claim 5, wherein the output circuit comprises:
    a low-pass filter including an inductor and configured to produce the output current for driving the LED lamp from an output terminal of the low-pass filter; and
    a free-wheeling diode coupled between input terminals of the low-pass filter.

7. The circuit of claim 1, wherein the rectifying circuit includes a full-wave rectifier.

8. The circuit of claim 1, wherein the rectifying circuit includes a half-wave rectifier.

9. The circuit of claim 1, further comprising a thermistor connected in series with the inductive load to receive the AC power.

10. The circuit of claim 1, further comprising a parallel interconnection of a resistor and a switch, wherein the parallel interconnection is coupled in series with the inductive load to receive the AC power.

11. An illuminating apparatus for producing light using a light emitting diode (LED) lamp including a plurality of LEDs based on alternating current (AC) power received from a ballast stabilizer configured to drive a lamp, the illuminating apparatus comprising:
    a transformer coupled to the ballast stabilizer, configured to receive the AC power and to output transformed AC power having an amplitude appropriate for driving the LED lamp;
    a rectifying circuit configured to receive the transformed AC power from the transformer, and to rectify the AC power into direct current (DC) power for driving the LED lamp; and
    an output circuit configured to receive and filter the rectified DC power from the rectifying circuit, and to drive the LED lamp using the filtered DC power,
    wherein the transformer includes two output windings each coupled between two of at least three output terminals of the transformer.

12. The illuminating apparatus of claim 11, wherein the transformer is directly connected to the ballast stabilizer.

13. The illuminating apparatus of claim 11, wherein the output circuit comprises an inductor.

14. The illuminating apparatus of claim 13, wherein the output circuit further comprises:
    a filter circuit including the inductor and driving the LED lamp; and
    a free-wheeling diode coupled between input terminals of the filter circuit and configured to cause the filter circuit to provide DC power to the LED lamp when the rectifying circuit is turned off.

15. The illuminating apparatus of claim 11, wherein the transformer comprises at least two input windings each coupled between two of at least three input terminals receiving the AC power, such that a voltage difference exists between two input terminals of each input winding.

16. The illuminating apparatus of claim 11, wherein the rectifying circuit includes a full-bridge diode rectifier.

17. The illuminating apparatus of claim 11, wherein the rectifying circuit includes a half-wave diode rectifier.

18. The illuminating apparatus of claim 11, wherein the output circuit comprises at least one of a DC-DC converter and a linear regulator driving the LED lamp using the filtered DC power.

19. The illuminating apparatus of claim 11, wherein the rectifying circuit is a full-wave rectifier including two rectifying diodes each coupled to one of the two output windings.

20. A circuit for driving a light emitting diode (LED) lamp based on alternating current (AC) power received from a ballast stabilizer configured to drive a lamp, the circuit comprising:
   an inductive load coupled to the ballast stabilizer and configured to receive the AC power at terminals thereof;
   a rectifying circuit coupled to the inductive load and configured to produce rectified direct current (DC) power at a pair of output terminals; and
   a filter circuit comprising a series interconnection of an inductor and a capacitor, wherein the series interconnection is coupled between the pair of output terminals of the rectifying circuit, and wherein a voltage across the capacitor drives the LED lamp,
   wherein the inductive load includes two output windings each coupled between input terminals of the rectifying circuit.

21. The circuit of claim 20, further comprising at least one of a DC-DC converter and a linear regulator driving the LED lamp using the voltage across the capacitor.

22. The circuit of claim 20, wherein the ballast stabilizer is configured to drive a fluorescent lamp.

23. The circuit of claim 20, wherein the ballast stabilizer is configured to drive a halogen lamp.

24. An illuminating apparatus comprising:
   a plate including a light emitting diode (LED) lamp comprising a plurality of LEDs, and a circuit for driving the LED lamp based on alternating current (AC) power received from a ballast stabilizer configured to drive a lamp;
   a housing having the plate mounted therein, and configured to protect the plate, LED lamp, and driving circuit; and
   a socket disposed in an end portion of the plate and configured to receive the AC power from the ballast stabilizer at a pair of terminals,
   wherein the circuit for driving the LED lamp disposed on the plate comprises:
      an inductive load coupled to the pair of terminals of the socket and configured to receive the AC power from the ballast stabilizer;
      a rectifying circuit, electrically coupled to the inductive load and configured to rectify the AC power to produce a unidirectional current; and
      an output circuit configured to receive the unidirectional current from the rectifying circuit, and to produce an output current for driving the LED lamp, and
   wherein the inductive load comprises at least one of:
      two input windings coupled between three input terminals receiving the AC power from the ballast stabilizer; and
      two output windings coupled between three output terminals of the rectifying circuit.

25. The illuminating apparatus of claim 24, wherein the inductive load is a transformer directly connected to the pair of terminals of the socket to receive the AC power from the ballast stabilizer, and configured to receive the AC power at terminals of an input winding of the transformer and to produce a transformed AC power at terminals of an output winding of the transformer.

26. The illuminating apparatus of claim 25, wherein the rectifying circuit comprises a rectifying diode coupled to a terminal of the output winding of the inductive load.

27. The illuminating apparatus of claim 26, wherein the output circuit comprises:
   a low-pass filter including a series interconnection of an inductor and a capacitor, wherein the LED lamp is coupled in parallel with the capacitor; and
   a free-wheeling diode coupled between input terminals of the low-pass filter.

28. The illuminating apparatus of claim 24, wherein each LED of the plurality of LEDs comprises:
   a substrate;
   a first conductivity-type semiconductor layer disposed on the substrate;
   an active layer disposed on the first conductivity-type semiconductor layer;
   a second conductivity-type semiconductor layer disposed on the active layer; and
   first and second electrodes electrically connected to the first and second conductivity-type semiconductor layers, respectively.

29. The illuminating apparatus of claim 28, wherein the first electrode of each LED includes a first electrode layer extending through one or more contact holes extending through the active layer and the second conductivity-type semiconductor layer, and the first electrode layer is electrically insulated from the second conductivity-type semiconductor layer and the active layer by an insulating layer.

30. The illuminating apparatus of claim 28, wherein each LED of the plurality of LEDs comprises a plurality of nano light emitting structures, and each nano light emitting structures includes a nanocore having a rod structure and formed of the first conductivity-type semiconductor layer, the active layer disposed on the nanocore, and the second conductivity-type semiconductor layer disposed on the active layer.

31. The illuminating apparatus of claim 28, wherein each LED is located in a chip scale package (CSP) disposed on the plate and including:
   a package body having the LED disposed thereon;
   a plurality of electrodes disposed in the package body and electrically connected to the first and second electrodes of the LED; and
   a lens disposed above the package body and configured to guide light emitted by the LED.

32. The illuminating apparatus of claim 28, wherein the plate comprises:
   a metal layer;
   an insulating layer disposed on the first metal layer; and
   a second metal layer disposed on the insulating layer,
   wherein the plate includes a region located at an edge of the plate and in which the insulating layer does not have the second metal layer disposed thereon.

* * * * *